(12) United States Patent
Hara et al.

(10) Patent No.: US 11,174,342 B2
(45) Date of Patent: Nov. 16, 2021

(54) PELLET OF LIQUID CRYSTAL POLYESTER RESIN COMPOSITION AND METHOD OF PRODUCING PELLET OF LIQUID CRYSTAL POLYESTER RESIN COMPOSITION

(71) Applicant: SUMITOMO CHEMICAL COMPANY, LIMITED, Tokyo (JP)

(72) Inventors: Tomoyuki Hara, Tokyo (JP); Masanobu Uonami, Niihama (JP); Yoshio Shoda, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/818,757

(22) Filed: Mar. 13, 2020

(65) Prior Publication Data

US 2020/0362099 A1 Nov. 19, 2020

(30) Foreign Application Priority Data

May 17, 2019 (JP) .............................. JP2019-093680

(51) Int. Cl.
*C08G 63/60* (2006.01)
*C08K 7/14* (2006.01)
(Continued)

(52) U.S. Cl.
CPC ............. *C08G 63/605* (2013.01); *B29B 7/46* (2013.01); *B29B 7/90* (2013.01); *B29B 9/06* (2013.01); *C08J 3/203* (2013.01); *C08K 3/34* (2013.01); *C08K 3/40* (2013.01); *C08K 7/14* (2013.01); *B29K 2067/00* (2013.01);
(Continued)

(58) Field of Classification Search
None
See application file for complete search history.

(56) References Cited

U.S. PATENT DOCUMENTS 5,268,414 A 12/1993 Nakai et al.
6,793,847 B2 9/2004 Maeda et al.
(Continued)

FOREIGN PATENT DOCUMENTS

CN 101168605 A 4/2008
CN 102477213 A 5/2012
(Continued)

OTHER PUBLICATIONS

Japanese Notice of Reason for Rejection issued in corresponding Japanese Patent Application No. 2019-093680, dated Jul. 2, 2019, with English translation.
(Continued)

*Primary Examiner* — Ronak C Patel
(74) *Attorney, Agent, or Firm* — McDermott Will & Emery LLP

(57) ABSTRACT

The present invention relates to a pellet of a liquid crystal polyester resin composition, including a liquid crystal polyester resin (A) and an inorganic filler (B), in which the pellet has voids with a sphere equivalent diameter of 10 μm to 1000 μm, an abundance ratio of voids having a sphere equivalent diameter of less than 400 μm in a total amount of the voids is in a range of 40% to 90%, and an average number of the voids in one pellet having a length of 1 mm to 5 mm and a maximum diameter of 1 mm to 3 mm is in a range of 4 to 9.

15 Claims, 2 Drawing Sheets

(51) Int. Cl.
  *C08K 3/40* (2006.01)
  *C08K 3/34* (2006.01)
  *C08J 3/20* (2006.01)
  *B29B 7/90* (2006.01)
  *B29B 9/06* (2006.01)
  *B29B 7/46* (2006.01)
  *B29K 67/00* (2006.01)
  *B29K 509/02* (2006.01)
  *B29K 509/08* (2006.01)

(52) U.S. Cl.
  CPC ...... *B29K 2509/02* (2013.01); *B29K 2509/08* (2013.01); *C08G 2250/00* (2013.01); *C08K 2003/343* (2013.01)

(56) References Cited

U.S. PATENT DOCUMENTS

| | | | |
|---|---|---|---|
| 2003/0089887 | A1 | 5/2003 | Okamoto et al. |
| 2010/0060134 | A1 | 3/2010 | Saito et al. |
| 2010/0327728 | A1 | 12/2010 | Saito et al. |
| 2011/0114884 | A1* | 5/2011 | Fukuhara ............... C08K 3/013 252/299.6 |
| 2011/0189455 | A1 | 8/2011 | Fukuhara et al. |
| 2012/0025421 | A1 | 2/2012 | Fukuhara et al. |
| 2012/0135228 | A1 | 5/2012 | Fukuhara et al. |
| 2012/0153224 | A1 | 6/2012 | Yonezawa et al. |
| 2012/0235090 | A1 | 9/2012 | Maeda et al. |
| 2015/0252155 | A1 | 9/2015 | Sato |
| 2019/0044206 | A1* | 2/2019 | Gilchrist ............... H01Q 15/006 |

FOREIGN PATENT DOCUMENTS

| | | |
|---|---|---|
| CN | 104693597 A | 6/2015 |
| JP | 02-075653 A | 3/1990 |
| JP | 06-032880 A | 2/1994 |
| JP | 08-192421 A | 7/1996 |
| JP | 11-048278 A | 2/1999 |
| JP | 11-309715 A | 11/1999 |
| JP | 2003-096279 A | 4/2003 |
| JP | 2003-211443 A | 7/2003 |
| JP | 2004-196886 A | 7/2004 |
| JP | 2004-276598 A | 10/2004 |
| JP | 2004-351860 A | 12/2004 |
| JP | 4299691 B2 | 7/2009 |
| JP | 2010-089492 A | 4/2010 |
| JP | 2011-157421 A | 8/2011 |
| JP | 2011-207055 A | 10/2011 |
| JP | 4887645 B2 | 2/2012 |
| JP | 2012-046742 A | 3/2012 |
| JP | 2012-072370 A | 4/2012 |
| JP | 2012-102275 A | 5/2012 |
| JP | 2012-126842 A | 7/2012 |
| JP | 2013-227455 A | 11/2013 |
| JP | 2015-183159 A | 10/2015 |
| JP | 2017-137438 A | 8/2017 |
| JP | 2017-148997 A | 8/2017 |
| JP | 2018-188528 A | 11/2018 |
| JP | 2018-188529 A | 11/2018 |
| JP | 2019-093680 A | 6/2019 |
| TW | 201249626 A | 12/2012 |
| WO | 2014/030541 A1 | 2/2014 |
| WO | 2018/199155 A1 | 11/2018 |

OTHER PUBLICATIONS

Japanese Notice of Allowance issued in corresponding Japanese Patent Application No. 2019-093680, dated Jan. 7, 2020, with English translation and verification.
Extended European Search Report issued in corresponding European Patent Application No. 20162665.2-1014, dated Sep. 11, 2020.
Chinese Office Action issued in corresponding Chinese Patent Application No. 202010182201.3, dated Jul. 29, 2020, with English translation.
Korean Office Action issued in corresponding Korean Patent Application No. 10-2020-0032196, dated Jul. 30, 2020, with English translation.
Taiwanese Office Action issued in corresponding Taiwanese Patent Application No. 109108382, dated Oct. 29, 2020, with English translation.
India Office Action issued in corresponding India Patent Application No. 202044011141, dated Dec. 9, 2020.
Chinese Office Action issued in corresponding Chinese Patent Application No. 202010182201.3, dated Feb. 20, 2021, with English translation.
Vietnam Office Action issued in corresponding Vietnam Patent Application No. 1-2020-01530, dated Sep. 8, 2020, with English translation.

\* cited by examiner

PELLET OF LIQUID CRYSTAL POLYESTER RESIN COMPOSITION AND METHOD OF PRODUCING PELLET OF LIQUID CRYSTAL POLYESTER RESIN COMPOSITION

BACKGROUND OF THE INVENTION

Field of the Invention

The present invention relates to a pellet of a liquid crystal polyester resin composition and a method for producing a pellet of a liquid crystal polyester resin composition.

Priority is claimed on Japanese Patent Application No. 2019-93680, filed on May 17, 2019, the content of which is incorporated herein by reference.

Description of Related Art

A liquid crystal polyester is typically referred to as a molten liquid crystal type (thermotropic liquid crystal) polymer.

A liquid crystal polyester has unique behaviors, for example, remarkably excellent melt fluidity and heat distortion resistance of 300° C. or higher depending on the molecular structure thereof.

The liquid crystal polyester is used in molded products for applications such as electronic components, automobile components, OA components, heat-resistant tableware, and the like by using excellent fluidity and heat resistance thereof.

In recent years, reduction in size and thickness of electronic devices has proceeded. In electronic components such as connectors, the tendency of reduction in size and thickness is significant, and a liquid crystal polyester is widely employed.

In electronic component applications, the reflow temperature is increased due to leadless solder. In such a case, swelling (hereinafter, also referred to as blisters) of the surface of a molded product of a liquid crystal polyester occurs by performing a reflow treatment on the molded product thereof at a high temperature. Blisters result in poor appearance and dimensional defects of products.

Blisters are considered to be generated due to decomposed gas contained in resins and air or moisture entrained during melt plasticization in a molding machine.

A plurality of methods have been suggested as a method for solving the problem of blisters of the molded product of the liquid crystal polyester.

Specifically, a method for adjusting the screw engagement ratio in a case where a liquid crystal polyester resin and an inorganic filler are melt-kneaded (see Japanese Unexamined Patent Application, First Publication No. 2003-211443) and a method for adjusting the length or diameter of a cylinder and the screw diameter (see Japanese Unexamined Patent Application, First Publication No. 2012-072370) have been suggested.

SUMMARY OF THE INVENTION

The methods described in the patent documents above have room for improvement in terms of suppressing the generation of blisters.

An object of the present invention is to provide a pellet of a liquid crystal polyester resin composition and a method for producing a pellet of a liquid crystal polyester resin composition, in which blisters of a molded product are unlikely to be generated during molding or in a reflow step at a high temperature.

As the result of intensive research conducted by the present inventors, it was found that the blister resistance of a molded product is significantly improved while the physical properties such as mechanical strength of a molded product to be obtained are maintained by allowing a pellet of a liquid crystal polyester resin composition to have a specific amount of voids having a specific sphere equivalent diameter, thereby completing the present invention.

That is, the present invention includes the following inventions [1] to [7].

[1] A pellet of a liquid crystal polyester resin composition, including: a liquid crystal polyester resin (A); and an inorganic filler (B), in which the pellet has voids with a sphere equivalent diameter of 10 µm to 1000 µm, and an abundance ratio of voids having a sphere equivalent diameter of less than 400 µm in a total amount of the voids is in a range of 40% to 90%.

[2] The pellet according to [1], in which an average number of the voids in one pellet having a length of 1 mm to 5 mm and a maximum diameter of 1 mm to 3 mm is in a range of 4 to 9.

[3] The pellet according to [1] or [2], in which D50 of a sphere equivalent diameter of the voids in the pellet is in a range of 200 µm to 500 µm.

[4] The pellet according to any one of [1] to [3], in which an average volume ratio of one void in one pellet is in a range of 0.040% to 0.12%.

[5] The pellet according to any one of [1] to [4], in which the abundance ratio of voids having a sphere equivalent diameter of less than 400 µm in the total amount of the voids is in a range of 70% to 90%.

[6] The pellet according to any one of [1] to [5], in which the inorganic filler (B) is at least one inorganic filler selected from the group consisting of chopped glass fibers, milled glass fibers, talc, and mica.

[7] A method for producing a pellet of a liquid crystal polyester resin composition which contains a liquid crystal polyester resin (A) and an inorganic filler (B), the method including: a step of melt-kneading the liquid crystal polyester resin (A) and the inorganic filler (B) using an extruder, in which the extruder includes a main feed port, a downstream side adjacent portion, and a first side feed port in this order toward a downstream in an extrusion direction, the extruder supplies the liquid crystal polyester resin (A) from the main feed port and supplies the inorganic filler (B) from the first side feed port, the downstream side adjacent portion and the first side feed port each include a heater, and a set temperature of the heater included in the first side feed port is set to be higher than a set temperature of the heater included in the downstream side adjacent portion by 50° C. to 100° C.

[8] The method for producing a pellet of a liquid crystal polyester resin composition according to [7], wherein the extruder further includes a second side feed port on the downstream side of the first side feed port in the extrusion direction, the extruder supplies the inorganic filler (B) from the second side feed port, the second side feed port includes a heater, and a set temperature of the heater included in the second side feed port is set to be lower than the set temperature of the heater included in the first side feed port by 10° C. to 30° C.

According to the present invention, it is possible to provide a pellet of a liquid crystal polyester resin composition and a method for producing a pellet of a liquid crystal polyester resin composition, in which blisters of a molded product are unlikely to be generated while the physical properties such as the mechanical strength of the molded product are maintained.

For example, according to a pellet of a liquid crystal polyester resin composition in the present invention, the occurrence of blisters of a molded product can be reduced during molding or in a reflow step at a high temperature (for example, 260 to 310° C.).

DETAILED DESCRIPTION OF THE INVENTION

<Pellet>

Figure 1:
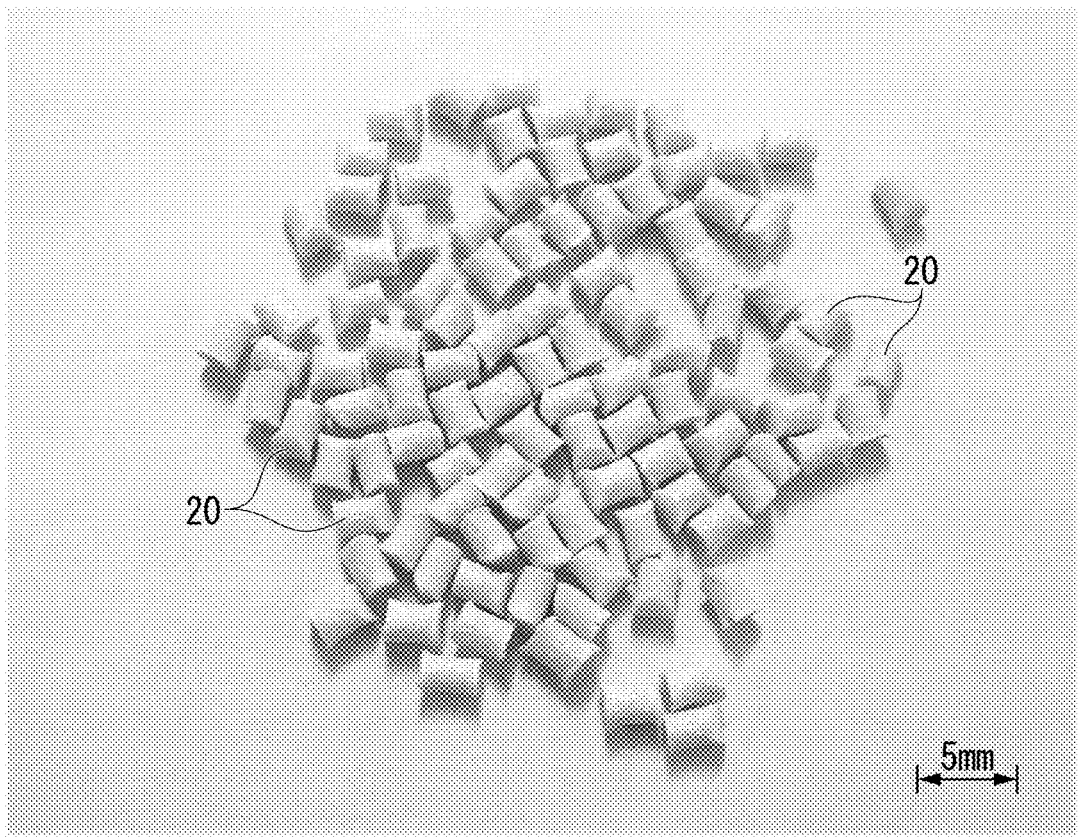
FIG. 1 is a photograph showing one embodiment of a pellet of a liquid crystal polyester resin composition.

FIG. 1 shows an embodiment of a pellet of a liquid crystal polyester resin composition, and is a photograph of a plurality of pellets 20 placed on a flat plate taken from above the pellets 20.

The pellet 20 of the present embodiment relates to a pellet of a liquid crystal polyester resin composition containing a liquid crystal polyester resin (A) and an inorganic filler (B).

In the present embodiment, the content of the liquid crystal polyester resin (A) is preferably 50% by mass or greater, more preferably 50% by mass or greater and 70% by mass or less, and further preferably 55% by mass or greater and 65% by mass or less with respect to the total mass of the pellets.

In the present embodiment, the content of the inorganic filler (B) is preferably 30% by mass or greater and 50% by mass or less, more preferably 35% by mass or greater and 45% by mass or less with respect to the total mass of the pellets.

The pellet according to the present embodiment has voids with a sphere equivalent diameter of 10 µm to 1000 µm. In the pellet according to the present embodiment, the abundance ratio of voids with a sphere equivalent diameter of less than 400 µm in the total amount of voids is in a range of 40% to 90%.

The sphere equivalent diameter of voids included in the pellet of the present embodiment, the abundance ratio of voids with the sphere equivalent diameter, the average number of voids in one pellet, and D10, D50 and D90 of the sphere equivalent diameters are values measured or specified by X-ray computed tomography (hereinafter, also referred to as X-ray CT).

In the present embodiment, the void included in the pellet indicates a space which is completely enclosed in the pellet and occupied by a component other than a resin component constituting the pellet.

Here, the "resin component constituting the pellet" indicates a component derived from the liquid crystal polyester resin composition.

The components derived from the liquid crystal polyester resin composition include a liquid crystal polyester resin (A), an inorganic filler (B), and optionally compounded other components (additive components).

The space contains air and gas. In addition, the space is an independent space that does not communicate with the outside of the pellet. Here, pores communicating with the outside of the pellet are set to be not included in the voids in the present specification.

The length and the shape of the pellet according to the present embodiment are not particularly limited and can be arbitrarily selected depending on the purpose thereof. For example, the pellet is obtained by extruding a kneaded product in the form of a strand from an extruder or the like and pelletizing the strand using a cutter having a rotary blade.

The length of the pellet is preferably in a range of 1 to 5 mm and more preferably in a range of 2 to 4 mm. The length of the pellet can be adjusted by the speed of the rotary blade.

Preferred examples of the shape of the pellet include a spherical shape, a strip shape, a spheroidal shape, a shape which is somewhat deformed from an exact spheroidal shape, and a columnar shape. Among these, a columnar pellet whose cross section has a substantially elliptical shape is preferable. That is, in the present specification, a columnar pellet is preferable, and the shape of a cross section perpendicular to the length direction of the pellet of the "columnar pellet" is widely interpreted, and the shape of the cross section includes, for example, a circle shape, an ellipse shape, an oval shape, a rounded rectangle shape, a roughly shape thereof, or a composite shape thereof, preferably an ellipse shape or a roughly ellipse shape.

The maximum diameter of the pellet according to the present embodiment is the length shown as a short side of a rectangle circumscribing a projected image of the front surface of the pellet.

The maximum diameter of the pellet according to the present embodiment is not particularly limited as long as the effects of the invention are not impaired, but is preferably in a range of 1 mm to 5 mm, more preferably in a range of 1 mm to 4 mm, still more preferably in a range of 1 mm to 3 mm, and particularly preferably in a range of 2 mm to 3 mm.

The minor axis of the pellet according to the present embodiment is the length shown as a straight line which is perpendicular to the maximum diameter in the cross section of the pellet and connects the two most distant points on the outer periphery of the cross section of the pellet.

The minor axis of the pellet according to the present embodiment is not particularly limited as long as the effects of the present embodiment are not impaired, but the ratio of the maximum diameter to the minor axis (maximum diameter/minor axis) is preferably in a range of 0.3 to 4, more preferably in a range of 1 to 4.

In a case of a pellet whose cross section is not circular, the maximum width of the central portion of the cross section corresponds to the maximum diameter, and the minimum width corresponds to the minor axis.

The maximum diameter and the minor axis of the pellet according to the present embodiment can be adjusted by adjusting the diameter of a nozzle of an extruder or the like so that the diameter of the strand is changed.

For example, in the case where the pellet has a length of 1 mm to 5 mm and a maximum diameter of 1 mm to 3 mm, the volume of one pellet is preferably in a range of $7.5 \times 10^8$ µm$^3$ to $4.0 \times 10^{10}$ µm$^3$, but the present invention is not limited thereto.

In the present embodiment, the "volume of the pellet" indicates the total amount of the volume of the resin component constituting the pellet and the volume of the voids included in the pellet.

In the pellet according to the present embodiment, from the viewpoints of the mechanical strength and the blister resistance of the molded product, the average volume ratio of one void in one pellet is preferably in a range of 0.040% to 0.12%, more preferably in a range of 0.040% to 0.11%, and still more preferably in a range of 0.040% to 0.080%.

The average volume ratio (%) of one void in one pellet is obtained based on the ratio of the average number of voids included in one pellet [the value obtained by dividing the total number of voids in all pellets measured by the total number of all pellets (number of all measured pellets) measured (number/1 pellet)] to the value (the ratio (%) of the volume of voids to the volume of pellets) obtained by dividing the total volume of voids in all pellets measured by the total volume of all pellets which has been similarly measured.

Further, from the viewpoints of the mechanical strength and the blister resistance of the molded product, the average volume of one void in the pellets according to the present embodiment is preferably in a range of $4.0 \times 10^6$ to $1.0 \times 10^7$ ($\mu m^3$/1 void), more preferably in a range of $4.0 \times 10^6$ to $9.5 \times 10^6$ ($\mu m^3$/1 void), and still more preferably in a range of $4.1 \times 10^6$ to $6.0 \times 10^7$ ($\mu m^3$/1 void).

Method for Calculating Sphere Equivalent Diameter of Void

The sphere equivalent diameter of a void indicates the diameter ($\Phi$) of a sphere at the time of conversion of the volume (V) of a certain void to a complete sphere, and can be acquired based on the following formula.

$$\text{Sphere equivalent diameter } (\Phi) = 2 \times \sqrt[3]{((3/4 \times V/\pi))}$$

Method for Calculating Abundance Ratio of Sphere Equivalent Diameter of Void

The abundance ratio of the sphere equivalent diameter of voids indicates a value obtained by dividing the volume of a certain void or the sum of the volumes of each void with a sphere equivalent diameter in a certain range by the sum of the volumes of all the voids.

Method for Calculating Average Number of Voids

The average number of the voids in one pellet (average number of voids) indicates a value obtained by dividing the total number of voids by the total number of measured pellets.

According to the present embodiment, D10 of voids is defined as, in the volume-based cumulative particle size distribution curve obtained by sequentially integrating the volumes of voids in an ascending order of the sphere equivalent diameter, the sphere equivalent diameter D10 (unit: $\mu m$) in a case where the cumulative volume in an ascending order of the sphere equivalent diameter becomes 10% with the total volume being set to 100%.

According to the present embodiment, D50 of voids is defined as, in the volume-based cumulative particle size distribution curve obtained by sequentially integrating the volumes of voids in an ascending order of the sphere equivalent diameter, the sphere equivalent diameter D50 (unit: $\mu m$) in a case where the cumulative volume in an ascending order of the sphere equivalent diameter becomes 50% with the total volume being set to 100%.

According to the present embodiment, D90 of voids is defined as, in the volume-based cumulative particle size distribution curve obtained by sequentially integrating the volumes of voids in an ascending order of the sphere equivalent diameter, the sphere equivalent diameter D90 (unit: $\mu m$) in a case where the cumulative volume in an ascending order of the sphere equivalent diameter becomes 90% with the total volume being set to 100%.

The voids included in the pellet can be measured nondestructively using a known X-ray CT device.

The pellet according to the present embodiment has voids with a sphere equivalent diameter of 10 $\mu m$ to 1000 $\mu m$.

The sphere equivalent diameter D50 is preferably in a range of 200 $\mu m$ to 500 $\mu m$ and more preferably in a range of 250 $\mu m$ to 450 $\mu m$.

The sphere equivalent diameter D10 is preferably in a range of 150 $\mu m$ to 240 $\mu m$, more preferably in a range of 160 $\mu m$ to 239 $\mu m$, and particularly preferably in a range of 165 $\mu m$ to 238 $\mu m$.

For example, the sphere equivalent diameter D90 is preferably in a range of 420 $\mu m$ to 600 $\mu m$, more preferably in a range of 425 $\mu m$ to 590 $\mu m$, and particularly preferably in a range of 430 $\mu m$ to 580 $\mu m$.

In the pellet of the present embodiment, it is preferable that the sphere equivalent diameter D10 be in a range of 150 $\mu m$ to 240 $\mu m$, the sphere equivalent diameter D50 be in a range of 200 $\mu m$ to 500 $\mu m$, and the sphere equivalent diameter D90 be in a range of 420 $\mu m$ to 600 $\mu m$.

In the pellet of the present embodiment, it is more preferable that the sphere equivalent diameter D10 be in a range of 160 $\mu m$ to 239 $\mu m$, the sphere equivalent diameter D50 be in a range of 200 $\mu m$ to 500 $\mu m$, and the sphere equivalent diameter D90 be in a range of 425 $\mu m$ to 590 $\mu m$.

In the pellet of the present embodiment, it is further preferable that the sphere equivalent diameter D10 be in a range of 165 $\mu m$ to 238 $\mu m$, the sphere equivalent diameter D50 be in a range of 250 m to 450 $\mu m$, and the sphere equivalent diameter D90 be in a range of 430 $\mu m$ to 580 m.

In the present embodiment, the abundance ratio of voids with a sphere equivalent diameter of less than 400 $\mu m$ in all voids in the pellet is in a range of 40% to 90%, preferably in a range of 60% to 90%, and particularly preferably in a range of 70% to 90%.

The abundance ratio of voids with a sphere equivalent diameter of less than 400 lam can be acquired as the cumulative volume (%) of voids with a sphere equivalent diameter of less than 400 $\mu m$ in the volume-based cumulative particle size distribution curve.

In the present embodiment, the average number of voids in one pellet with the size, in which the length of the pellet is preferably in a range of 1 mm to 5 mm and more preferably in a range of 2 mm to 4 mm, and the maximum diameter of the pellet is in a range of 1 mm to 4 mm and more preferably in a range of 2 mm to 3 mm, is preferably in a range of 4 to 9 and more preferably in a range of 5 to 9.

In a case where the sphere equivalent diameter of the voids, the abundance ratio of voids with a sphere equivalent diameter of less than 400 $\mu m$, and the average number of voids are in the above-described ranges, air is unlikely to be entrained at the time of plasticization (melting) of the pellet using an injection molding machine according to the present embodiment so that the generation of blisters can be reduced.

The reason for this is assumed to be that since the size of voids is small even in a case of the presence of voids, the amount of air that expands due to heating of the pellet during the melting is small or extremely small so that air is unlikely to be entrained in the molded product and blisters are unlikely to be generated. Further, it is assumed that defoaming is likely to occur due to the back pressure of the injection molding machine during the plasticization.

In addition, it is assumed that even in a case where voids are present in the molded product, the voids are finely dispersed in the molded product because the voids are small, and thus the generation of blisters is suppressed.

In the present embodiment, the number of voids, the volume of the pellet, and the volume of the voids can be measured by performing 3D image analysis on images of 200 or more pellets (for example, 200 to 800 pellets) which are obtained using X-ray CT.

Various containers can be used as a container to be filled with the pellets, but a container through which X-rays can be sufficiently transmitted is preferable. In the present embodiment, 200 or more pellets are measured by performing X-ray CT measurement once using a polypropylene vial bottle (with an external size of 20 to 25 mm and a thickness of approximately 1 mm).

The X-ray CT measurement is performed under the following measurement conditions.

X-ray CT device: "skyscan1272" manufactured by Bruker, Inc.
Tube voltage: 90 kV
Tube current: 111 μA
Filter: 0.5 mm Al filter+0.038 mm Cu filter
Number of times of integration: two times
Rotation step: 0.4 degree
Rotation: 180 degree scanning
Number of pixels: 1344×896 pixels
Size of field of view: approximately 2680 mm (width) and approximately 1790 mmh (height)
Resolution: 20 μm/pixel

[Method for Measuring Voids and the Like in Pellet]

In the present embodiment, the number of voids, the pellet volume, and the void volume can be measured by filling a polypropylene container with 200 or more of the obtained pellets and performing 3D image analysis on images obtained using an X-ray CT scanner.

3D Image Analysis Method

The obtained X-ray CT image is reconstructed by performing image center adjustment and luminance adjustment using software "NRecon.exe; Version 1.6.10.1" attached to skyscan 1272.

The actual procedures are based on the manual. An example is described below.

First, a three-dimensional reconstructed image obtained using an X-ray CT scanner is created and stored in the TIF format.

Three-dimensional analysis is performed on the TIF file using quantitative analysis software "TRI/3D-BON-FCS: R10.01.10.29-H-64 (manufactured by Ratoc System Engineering Co., Ltd.)".

The specific operation of the quantitative analysis software is based on the manual of the analysis software, and the analysis is performed. This operation is performed by calculating the total volume of the pellets, the number of voids, and the volume of each void.

The length of the pellet and the maximum diameter of the pellet are acquired by the following procedures.

The pellet is placed on a flat plate so that the pellet can be in the most stable position. For example, 100 or more pellets are arranged such that the cross section of each pellet is in a direction perpendicular to the flat plate. In a case where the shape of the cross section of each pellet is close to an ellipse, each pellet is allowed to stand such that the major axis of the cross section thereof is in a direction horizontal to the flat plate.

Projected images (front projected images) of the arranged pellets are captured using a "VR-3200 one-shot 3D shape measuring device" (manufactured by Keyence Corporation) in a direction perpendicular to the flat plate on which the pellets are allowed to stand and from the above of the standing pellets.

Using the front projected images of the captured pellets, the horizontal Feret diameter (a long side of a rectangle circumscribing the front projected image) and the vertical Feret diameter (a short side of a rectangle circumscribing the front projected image) of each pellet are measured by performing analysis on each pellet using attached analysis software. The average value of the horizontal Feret diameter of each pellet is defined as the length of the pellet, and the average value of the vertical Feret diameter is defined as the maximum diameter of the pellet. Further, the minor axis of the cross section of the pellet can be measured as the average value of the maximum heights of cross sections of the pellet. Here, the "rectangle circumscribing the front projected image" is set so that a part of the front projected image can be inscribed in all four sides of the rectangle and the area of the rectangle can be minimized.

<<Liquid Crystal Polyester Resin (A)>>

The liquid crystal polyester resin (A) used in the present embodiment is a liquid crystal polyester exhibiting liquid crystallinity in a melted state, and it is preferable that the liquid crystal polyester resin be melted at a temperature of 450° C. or lower. Further, the liquid crystal polyester resin (A) may be a liquid crystal polyester amide, a liquid crystal polyester ether, a liquid crystal polyester carbonate, or a liquid crystal polyester imide. It is preferable that the liquid crystal polyester resin (A) be a wholly aromatic liquid crystal polyester resin formed by using only an aromatic compound as a raw material monomer.

Typical examples of the liquid crystal polyester resin (A) include a polymer with an aromatic hydroxycarboxylic acid, an aromatic dicarboxylic acid, an aromatic diol, and at least one compound selected from the group consisting of an aromatic hydroxylamine and an aromatic diamine; a polymer with a plurality of aromatic hydroxycarboxylic acids; a polymer with an aromatic dicarboxylic acid, an aromatic diol, and at least one compound selected from the group consisting of an aromatic hydroxylamine and an aromatic diamine; and a polymer with a polyester such as polyethylene terephthalate and an aromatic hydroxycarboxylic acid.

Here, in terms of ease of production, as monomers such as the aromatic hydroxycarboxylic acid, the aromatic dicarboxylic acid, the aromatic diol, the aromatic hydroxylamine, and the aromatic diamine, derivatives in which the monomers can be polymerized may be each and independently used in place of some or all the monomers.

Examples of the derivative in which a compound containing a carboxyl group such as an aromatic hydroxycarboxylic acid or an aromatic dicarboxylic acid can be polymerized include an ester obtained by converting a carboxyl group to an alkoxycarbonyl group or an aryloxycarbonyl group, an acid halide obtained by converting a carboxyl group to a haloformyl group, and an acid anhydride obtained by converting a carboxyl group to an acyloxycarbonyl group.

Examples of the derivative in which a compound containing a hydroxyl group such as an aromatic hydroxycarboxylic acid, an aromatic diol, or an aromatic hydroxylamine can be polymerized include an acylated compound obtained by converting a hydroxyl group to an acyloxyl group through acylation.

Examples of the derivative in which a compound containing an amino group such as an aromatic hydroxylamine or an aromatic diamine can be polymerized include an acylated compound obtained by converting an amino group to an acylamino group through acylation.

Among the polymerizable derivatives exemplified above, as a raw material monomer of the liquid crystal polyester, a polymerizable derivative in which a phenolic hydroxyl group forms an ester with lower carboxylic acids, that is, an acylated compound obtained by acylating an aromatic hydroxycarboxylic acid and an aromatic diol is preferable.

It is preferable that the liquid crystal polyester resin (A) have a repeating unit represented by Formula (1) (hereinafter, also referred to as a "repeating unit (1)") and more preferable that the liquid crystal polyester resin (A) have the repeating unit (1), a repeating unit represented by Formula (2) (hereinafter, also referred to as a "repeating unit (2)"), and a repeating unit represented by Formula (3) (hereinafter, also referred to as a "repeating unit (3)").

$$—O—Ar^1—CO— \quad (1)$$

$$—CO—Ar^2—CO— \quad (2)$$

$$—X—Ar^3—Y— \quad (3)$$

wherein Formulae (1) to (3), $Ar^1$ represents a phenylene group, a naphthylene group, or a biphenylylene group. $Ar^2$ and $Ar^3$ each independently represents a phenylene group, a naphthylene group, a biphenylylene group, or a group represented by Formula (4). X and Y each independently represents an oxygen atom or an imino group (—NH—). The hydrogen atoms in the group represented by $Ar^1$, $Ar^2$, or $Ar^3$ may each independently be substituted with a halogen atom, an alkyl group, or an aryl group.

$$—Ar^4—Z—Ar^5— \quad (4)$$

wherein $Ar^4$ and $Ar^5$ each independently represents a phenylene group or a naphthylene group. Z represents an oxygen atom, a sulfur atom, a carbonyl group, a sulfonyl group, or an alkylidene group. The hydrogen atoms in the group represented by $Ar^4$ or $Ar^5$ may each independently be substituted with a halogen atom, an alkyl group having 1 to 10 carbon atoms, or an aryl group having 6 to 20 carbon atoms.

Examples of the halogen atom which can be substituted with a hydrogen atom include a fluorine atom, a chlorine atom, a bromine atom, and an iodine atom.

Examples of the alkyl group having 1 to 10 carbon atoms which can be substituted with a hydrogen atom include a methyl group, an ethyl group, a 1-propyl group, an isopropyl group, a 1-butyl group, an isobutyl group, a sec-butyl group, a tert-butyl group, a 1-hexyl group, a 2-ethylhexyl group, a 1-octyl group, and a 1-decyl group.

Examples of the aryl group having 6 to 20 carbon atoms which can be substituted with a hydrogen atom include a monocyclic aromatic group such as a phenyl group, an orthotolyl group, a metatolyl group, or a paratolyl group; and a condensed aromatic group such as a 1-naphthyl group or a 2-naphthyl group.

In a case where one or more hydrogen atoms in the group represented by $Ar^1$, $Ar^2$, $Ar^3$, $Ar^4$, or $Ar^5$ are substituted with the halogen atom, the alkyl group having 1 to 10 carbon atoms, or the aryl group having 6 to 20 carbon atoms, the numbers of groups substituting the hydrogen atoms are each independently preferably 1 or 2 and more preferably 1 for each group represented by $Ar^1$, $Ar^2$, $Ar^3$, $Ar^4$, and $Ar^5$.

Examples of the alkylidene group include a methylene group, an ethylidene group, an isopropylidene group, a 1-butylidene group, and a 2-ethylhexylidene group. Further, the number of carbon atoms thereof is typically in a range of 1 to 10.

The repeating unit (1) is a repeating unit derived from a predetermined aromatic hydroxycarboxylic acid.

Examples of the aromatic hydroxycarboxylic acid include 4-hydroxybenzoic acid, metahydroxybenzoic acid, 6-hydroxy-2-naphthoic acid, 2-hydroxy-3-naphthoic acid, 1-hydroxy-5-naphthoic acid, 4-hydroxy-4'-carboxydiphenylether, and aromatic hydroxycarboxylic acids in which some hydrogen atoms in aromatic rings of these aromatic hydroxycarboxylic acids are substituted with substituents selected from the group consisting of an alkyl group, an aryl group, and a halogen atom. The aromatic hydroxycarboxylic acid may be used alone or in combination of two or more kinds thereof in production of the liquid crystal polyester.

As the repeating unit (1), a repeating unit in which $Ar^1$ represents a 1,4-phenylene group (a repeating unit derived from 4-hydroxybenzoic acid) or a repeating unit in which $Ar^1$ represents a 2,6-naphthylene group (a repeating unit derived from 6-hydroxy-2-naphthoic acid) is preferable.

The repeating unit (2) is a repeating unit derived from a predetermined aromatic dicarboxylic acid.

Examples of the aromatic dicarboxylic acid include terephthalic acid, isophthalic acid, biphenyl-4,4'-dicarboxylic acid, 2,6-naphthalenedicarboxylic acid, diphenyl ether-4,4'-dicarboxylic acid, diphenylthioether-4,4'-dicarboxylic acid, and aromatic dicarboxylic acids in which some hydrogen atoms in aromatic rings of these aromatic dicarboxylic acids are substituted with substituents selected from the group consisting of an alkyl group, an aryl group, and a halogen atom.

The aromatic dicarboxylic acid may be used alone or in combination of two or more kinds thereof in production of the liquid crystal polyester.

As the repeating unit (2), a repeating unit in which $Ar^2$ represents a 1,4-phenylene group (such as a repeating unit derived from terephthalic acid), a repeating unit in which $Ar^2$ represents a 1,3-phenylene group (such as a repeating unit derived from isophthalic acid), a repeating unit in which $Ar^2$ represents a 2,6-naphthylene group (such as a repeating unit derived from 2,6-naphthalenedicarboxylic acid), or a repeating unit in which $Ar^2$ represents a diphenylether-4,4'-diyl group (such as a repeating unit derived from diphenylether-4,4'-dicarboxylic acid) is preferable.

The repeating unit (3) is a repeating unit derived from a predetermined aromatic diol, an aromatic hydroxylamine, or an aromatic diamine.

Examples of the aromatic diol, the aromatic hydroxylamine, or the aromatic diamine include 4,4'-dihydroxybiphenyl, hydroquinone, resorcin, 4,4'-dihydroxydiphenyl ketone, 4,4'-dihydroxydiphenyl ether, bis(4-hydroxyphenyl) methane, 1,2-bis(4-hydroxyphenyl) ethane, 4,4'-dihydroxydiphenyl sulfone, 4,4'-dihydroxydiphenyl thioether, 2,6-dihydroxynaphthalene, 1,5-dihydroxynaphthalene, 4-aiuinophenol, 1,4-phenylenediamine, 4-amino-4'-hydroxybiphenyl, and 4,4'-diaminobiphenyl.

The aromatic diol, the aromatic hydroxylamine, or the aromatic diamine may be used alone or in combination of two or more kind thereof in the production of the liquid crystal polyester.

As the repeating unit (3), a repeating unit in which $Ar^3$ represents a 1,4-phenylene group (such as a repeating unit derived from hydroquinone, 4-aminophenol, or 1,4-phenylenediamine) or a repeating unit in which $Ar^3$ represents a 4,4'-biphenylylene group (such as a repeating unit derived from 4,4'-dihydroxybiphenyl, 4-amino-4'-hydroxybiphenyl, or 4,4'-diaminobiphenyl) is preferable.

In the present specification, the term "derived" indicates that the chemical structure is changed due to polymerization of a raw material monomer and other structures are not changed.

Next, preferable combinations of monomers from which the above-described structural units are derived will be described.

In the present embodiment, it is preferable that the above-described structural units of the liquid crystal polyester resin (A) be used in combinations shown in any of the following [a] to [p].

[a]: Combination of 4-hydroxybenzoic acid/terephthalic acid/isophthalic acid/4,4'-dihydroxybiphenyl

[b]: Combination of 4-hydroxybenzoic acid/terephthalic acid/4,4'-dihydroxybiphenyl

[c]: Combination of 4-hydroxybenzoic acid/6-hydroxy-2-naphthoic acid

[d]: Combination of 4-hydroxybenzoic acid/terephthalic acid/isophthalic acid/4,4'-dihydroxybiphenyl/hydroquinone

[e]: Combination of 4-hydroxybenzoic acid/terephthalic acid/2,6-naphthalenedicarboxylic acid/hydroquinone/4,4'-dihydroxybiphenyl

[f]: Combination of 4-hydroxybenzoic acid/terephthalic acid/2,6-naphthalenedicarboxylic acid/hydroquinone

[g]: Combination of 4-hydroxybenzoic acid/6-hydroxy-2-naphthoic acid/terephthalic acid/4,4'-dihydroxybiphenyl

[h]: Combination of 4-hydroxybenzoic acid/6-hydroxy-2-naphthoic acid/terephthalic acid/isophthalic acid,/4,4'-dihydroxybiphenyl

[i]: Combination of 4-hydroxybenzoic acid/6-hydroxy-2-naphthoic acid/terephthalic acid/4-aminophenol/4,4'-dihydroxybiphenyl

[j]: Combination of 4-hydroxybenzoic acid/6-hydroxy-2-naphthoic acid/terephthalic acid/hydroquinone

[k]: Combination of 4-hydroxybenzoic acid/2,6-naphthalenedicarboxylic acid/terephthalic acid/hydroquinone/4,4'-dihydroxybiphenyl

[l]: Combination of 4-hydroxybenzoic acid/6-hydroxy-2-naphthoic acid/2,6-naphthalenedicarboxylic acid/hydroquinone

[m]: Combination of 6-hydroxy-2-naphthoic acid/terephthalic acid/4-aminophenol

[n]: Combination of 6-hydroxy-2-naphthoic acid/terephthalic acid/2,6-naphthalenedicarboxylic acid/4,4'-dihydroxybiphenyl/hydroquinone

[o]: Combination of 4-hydroxybenzoic acid/6-hydroxy-2-naphthoic acid/terephthalic acid/2,6-naphthalenedicarboxylic acid/hydroquinone

[p]: Combination of 6-hydroxy-2-naphthoic acid/terephthalic acid/isophthalic acid/2,6-naphthalenedicarboxylic acid/hydroquinone Among the combinations [a] to [p], the combination [a] in which the molar ratio of 4,4'-dihydroxybiphenyl to 4-hydroxybenzoic acid (molar ratio of 4,4'-dihydroxybiphenyl/ 4-hydroxybenzoic acid) is in a range of 0.2 to 1.0, the molar ratio of the total amount of terephthalic acid and isophthalic acid to 4,4'-dihydroxybiphenyl (molar ratio of (terephthalic acid+isophthalic acid)/4,4'-dihydroxybiphenyl) is in a range of 0.9 to 1.1, and the molar ratio of isophthalic acid to terephthalic acid (molar ratio of isophthalic acid/terephthalic acid) is greater than 0 and 1 or less is preferable. In a case where such combinations of the structural units and the molar ratios thereof are satisfied, the melt fluidity of the liquid crystal polyester resin composition can be further improved, and the impact resistance of a molded product to be obtained can be improved.

The content of the repeating unit (1) is typically 30 mol % or greater, preferably in a range of 30 to 80 mol %, more preferably 35 to 70 mol %, and still more preferably in a range of 35 to 65 mol % with respect to the total amount of all repeating units (a value obtained by dividing the mass of each repeating unit constituting the liquid crystal polyester by the formula amount of each repeating unit to acquire the substance equivalent (mol) of each repeating unit and summing these acquired values).

The content of the repeating unit (2) is typically 35 mol % or less, preferably in a range of 10 to 35 mol %, more preferably in a range of 15 to 30 mol %, and still more preferably in a range of 17.5 to 27.5 mol % with respect to the total amount of all the repeating units.

The content of the repeating unit (3) is typically 35 mol % or less, preferably in a range of 10 to 35 mol %, more preferably in a range of 15 to 30 mol %, and still more preferably in a range of 17.5 to 27.5 mol % with respect to the total amount of all the repeating units.

The total of the content of the repeating unit (1) of the liquid crystal polyester, the content of the repeating unit (2) of the liquid crystal polyester, and the content of the repeating unit (3) of the liquid crystal polyester does not exceed 100 mol %.

The ratio between the content of the repeating unit (2) and the content of the repeating unit (3) is represented by [content of repeating unit (2)]/[content of repeating unit (3)] (mol/mol) and is typically in a range of 0.9/1 to 1/0.9, preferably in a range of 0.95/1 to 1/0.95, and more preferably in a range of 0.98/1 to 1/0.98.

Further, the liquid crystal polyester resin (A) may have two or more of the repeating units (1) to (3) each independently. Further, the liquid crystal polyester may have repeating units other than the repeating units (1) to (3), and the content thereof is typically 10 mol % or less and preferably 5 mol % or less with respect to the total amount of all repeating units.

It is preferable that the liquid crystal polyester resin (A) have, as the repeating unit (3), a repeating unit in which X and Y each represent an oxygen atom, that is, a repeating unit derived from a predetermined aromatic diol from the viewpoint that the melt viscosity is easily decreased and more preferable that the liquid crystal polyester resin (A) have, as the repeating unit (3), only a repeating unit in which X and Y each represents an oxygen atom.

It is preferable that the liquid crystal polyester resin (A) be produced by performing melt polymerizing on the raw material monomers corresponding to the repeating units constituting the resin and performing solid phase polymerization on the obtained polymer (hereinafter, also referred to as a "prepolymer"). In this manner, a high-molecular-weight liquid crystal polyester with excellent heat resistance and excellent strength and rigidity can be produced with satisfactory operability.

The melt polymerization may be performed in the presence of a catalyst, and examples of such a catalyst include metal compounds such as magnesium acetate, stannous acetate, tetrabutyl titanate, lead acetate, sodium acetate, potassium acetate, and antimony trioxide; and nitrogen-containing heterocyclic compounds such as 4-(dimethylamino) pyridine and 1-methylimidazole. Among these, 1-methylimidazole is preferable.

The flow start temperature of the liquid crystal polyester resin (A) is preferably in a range of 270° C. to 400° C. and more preferably in a range of 280° C. to 380° C. In a case where the flow start temperature is in the above-described range, the fluidity of the liquid crystal polyester resin composition becomes satisfactory, and the heat resistance thereof also is likely to become excellent. Further, in the case where the flow start temperature is in the above-described range, thermal degradation is unlikely to occur at the time of performing melt molding for obtaining a molded product from the liquid crystal polyester.

Further, the flow start temperature is also referred to as a flow temperature and indicates a temperature showing that the viscosity is 4800 Pa·s at the time of melting the liquid crystal polyester and extruding the liquid crystal polyester from a nozzle having an inner diameter of 1 mm and a length of 10 mm while increasing the temperature at a rate of 4° C./min under a load of 9.8 MPa using a capillary type rheometer. The flow start temperature is an index indicating the molecular weight of liquid crystal polyester (see "Synthesis, Molding and Application of Liquid Crystalline Polymers", edited by KOIDE Naoyuki, p. 95, published by CMC Publishing CO., LTD., on Jun. 5, 1987).

The liquid crystal polyester may be used alone or in combination of two or more kinds thereof. In a case where two or more kinds thereof are used in combination, the combination and ratio can be arbitrarily set.

<<Inorganic Filler (B)>>

The inorganic filler (B) used in the present embodiment may be a fibrous filler, a plate-like filler, or a granular filler other than the fibrous, plate-like, and spherical fillers.

Examples of the fibrous inorganic filler include glass fibers; carbon fibers such as PAN-based carbon fibers and pitch-based carbon fibers; ceramic fibers such as silica fibers, alumina fibers, and silica alumina fibers; and metal fibers such as stainless fibers. Further, other examples thereof include whiskers such as potassium titanate whiskers, barium titanate whiskers, wollastonite whiskers, aluminum borate whiskers, silicon nitride whiskers, and silicon carbide whiskers. Among these, glass fibers are preferable.

Examples of the plate-like filler include talc, mica, graphite, wollastonite, glass flakes, barium sulfate, and calcium carbonate. Among these, talc or mica is preferable.

Examples of the granular filler include silica, alumina, titanium oxide, glass beads, glass balloons, boron nitride, silicon carbide, and calcium carbonate.

As the inorganic filler (B) used in the present embodiment, glass fibers, talc, or mica is preferable. Among these, at least one inorganic filler selected from the group consisting of chopped glass fibers, milled glass fibers, talc, and mica is preferable.

The chopped glass fiber used herein refers to a material (glass chopped strand) obtained by cutting a fiber bundle (glass strand) in which a plurality of glass single fibers drawn out from a spinning nozzle are directly aligned and bundled so that the fiber bundle length becomes 1.5 to 25 mm The milled glass fiber used herein refers to a material (milled fiber) obtained by grinding or cutting a strand to an extremely short length (approximately less than 1 mm).

The content of the inorganic filler (B) is preferably 5 parts by mass or greater, more preferably 10 parts by mass or greater, and still preferably 20 parts by mass or greater with respect to 100 parts by mass of the liquid crystal polyester resin (A). Further, the content of the inorganic filler (B) is preferably 100 parts by mass or less, more preferably 80 parts by mass or less, and still more preferably 70 parts by mass or less with respect to 100 parts by mass of the liquid crystal polyester resin (A).

The upper limit and the lower limit described above can be arbitrarily combined.

For example, the content of the inorganic filler (B) is preferably 5 parts by mass or greater and 100 parts by mass or less, more preferably 10 parts by mass or greater and 80 parts by mass or less, further preferably 20 parts by mass or greater and 70 parts by mass or less with respect to 100 parts by mass of the liquid crystal polyester resin (A).

Glass Fibers

Examples of the glass fibers include fibers produced using various methods, such as long fiber type chopped glass fibers and short fiber type milled glass fibers. Among these, two or more kinds thereof can be used in combination.

Examples of the kinds of the glass fibers include E-glass, A-glass, C-glass, D-glass, AR-glass, R-glass, S-glass, and mixtures thereof. Among these, E-glass is preferable from the viewpoints of the strength and the availability.

As the glass fibers, weak alkaline fibers can be preferably used from the viewpoint of excellent mechanical strength. Particularly, glass fibers in which the content of silicon oxide is in a range of 50 to 80% by mass, more preferably in a range of 65 to 77% by mass are used.

The glass fibers may be fibers treated with a coupling agent such as a silane-based coupling agent or a titanium-based coupling agent as necessary.

The glass fibers may be coated with a thermoplastic resin such as a urethane resin, an acrylic resin, or an ethylene/vinyl acetate copolymer or a thermosetting resin such as an epoxy resin, or may be treated with a sizing agent.

The average fiber length of the glass fibers serving as a raw material provided for melt-kneading is preferably in a range of 50 µm to 3500 µm. In a case where the average fiber length of the glass fibers is 50 µm or greater, the effect of the glass fibers as a reinforcing material in the molded product obtained from the resin composition containing the glass fibers is further improved compared to a case where the average fiber length thereof is less than 50 µm. The average fiber length of the glass fibers is more preferably 60 µm or greater and still more preferably 70 µm.

Further, in a case where the average fiber length of the glass fibers is 3500 µm or less, the number-average fiber length of the glass fibers in the resin composition is easily adjusted so that the thin fluidity is further improved compared to a case where the average fiber length thereof is greater than 3500 µm. The average fiber length of the glass fibers is more preferably 3000 µm or less.

The upper limit and the lower limit described above can be arbitrarily combined.

For example, the average fiber length of the glass fibers is more preferably 60 µm or greater and 3000 µm or less, and even more preferably 70 µm or greater and 3000 µm or less.

The fiber diameter (single fiber diameter) of the glass fibers serving as a raw material provided for melt-kneading is preferably in a range of 5 µm to 20 µm. In a case where the fiber diameter of the glass fibers is 5 µm or greater, the effect of reinforcing the molded product can be further increased compared to a case where the fiber diameter thereof is less than 5 µm. The fiber diameter of the glass fibers is more preferably 6 µm or greater. Further, in a case where the fiber diameter of the glass fibers is 20 µm or less, the fluidity of the resin composition is improved and the effect of the glass fibers as a reinforcing material in the molded product is further improved compared to a case where the fiber diameter thereof is greater than 20 m. The fiber diameter of the glass fibers is more preferably 17 µm or less and still more preferably 15 µm or less.

The upper limit and the lower limit described above can be arbitrarily combined.

For example, the fiber diameter (single fiber diameter) of the glass fiber is more preferably 5 µm or greater and 17 µm or less, and still more preferably 6 µm or greater and 15 µm or less.

Further, the glass fiber diameter does not substantially change even after melt-kneading.

In the present specification, the "average fiber length of the glass fibers serving as a raw material" indicates a value measured according to the method described in JIS R 3420 "7.8 length of chopped strand" unless otherwise specified.

Further, the "fiber diameter of the glass fibers serving as a raw material" indicates a value measured according to the "A method" among the methods described in JIS R 3420 "7.6 single fiber diameter" unless otherwise specified.

The content of the glass fibers is preferably 5 parts by mass or greater, more preferably 10 parts by mass or greater, and particularly preferably 15 parts by mass or greater with respect to 100 parts by mass of the liquid crystal polyester resin (A). Further, the content thereof is preferably 100 parts by mass or less, more preferably 80 parts by mass or less, and particularly preferably 60 parts by mass or less with respect to 100 parts by mass of the liquid crystal polyester resin (A).

The upper limit and the lower limit described above can be arbitrarily combined.

For example, the content of the glass fiber is preferably 5 parts by mass or greater and 100 parts by mass or less, more preferably 10 parts by mass or greater and 80 parts by mass or less, and still more preferably 15 parts by mass or greater and 60 parts by mass or less with respect to 100 parts by mass of the liquid crystal polyester resin (A).

The number-average fiber length of the glass fibers in the pellet according to the embodiment of the present invention is preferably 30 µm or greater, more preferably 50 µm or greater, and particularly preferably 60 µm or greater. Meanwhile, from the viewpoint of the fluidity of the liquid crystal polyester resin composition, the number-average fiber length thereof is preferably 300 µm or less, more preferably 200 mu or less, and particularly preferably 150 µm or less.

The upper limit and the lower limit described above can be arbitrarily combined.

For example, the number-average fiber length of the glass fibers is preferably 30 µm or greater and 300 µm or less, more preferably 50 µm or greater and 200 µm or less, and still more preferably 60 µm or greater and 150 µm or less.

Here, the number-average fiber length of the glass fibers in the pellet can be measured according to the following method. 5 g of the pellet formed of the composition containing glass fibers is heated in air of a muffle furnace at 600° C. for 8 hours to remove the resin, and the fiber lengths of 500 or more strands of glass fibers which are randomly selected from the remaining glass fibers using a microscope (VHX-1000, manufactured by Keyence Corporation) are measured at a magnification of 100 times. Here, the number-average fiber length Ln can be calculated according to the following equation.

$$Ln = \Sigma(Ni \times Li)/\Sigma(Ni)$$

Li represents a measured value of the fiber length of the glass fibers. Ni is calculated by (number of strands of glass fibers in which fiber length is included in Li)/(total number of strands of measured glass fibers).

Talc

Talc used in the present embodiment is a ground product of a mineral formed of magnesium hydroxide and a silicate mineral. Further, the talc has a structure formed by interposing an octahedral structure formed of three magnesium (Mg) oxides and hydroxides between four tetrahedral structures formed of four silicon (Si) oxide atoms.

Examples of a method for producing talc include dry grinding methods such as a milling type grinding method using a roller mill or a Raymond mill; an impact type grinding method using an atomizer, a hammer mill, or a micron mill; and a collision type grinding method using a jet mill or a ball mill.

Further, a wet grinding method for performing grinding using a ball mill, a bead mill, a wet jet mill, a Discoplex or the like in a state in which ground talc powder is brought into contact with water to obtain a slurry with a viscosity suitable for the slurry to be flowable may be used. Among the production methods, a dry grinding method is preferable from the viewpoints of economy and availability.

The surface of the talc may be treated with a coupling agent or the like to improve the wettability of the talc and the resin. Further, heat-treated talc may be used to remove impurities and harden the talc. Further, talc compressed to improve the handleability may be used.

The amount of residue of the talc on a 45 µm sieve is preferably 1.0% by mass or less. In a case where the amount of residue of the talc on the sieve is 1.0% by mass or less, blockage at a thin wall portion is suppressed during the molding so that the moldability is improved. Therefore, the thin wall strength can be improved. The amount of residue of the talc on a 45 µm sieve is preferably 0.8% by mass or less and more preferably 0.6% by mass or less with respect to the total amount of the talc.

The ignition loss (Ig. Loss) of the talc is preferably 7% or less, more preferably 6% or less, and particularly preferably 5% or less. As the Ig. Loss thereof decreases, decomposition of the liquid crystal polyester is suppressed and the solder resistance is improved. Further, in the present invention, the Ig. Loss is set as a measured value in conformity with JIS M 8853.

In the present embodiment, the volume-average particle diameter of talc is preferably 5.0 µm or greater, more preferably 5.5 µm or greater, and particularly preferably 6.0 µm or greater.

Further, the volume-average particle diameter thereof is preferably 30 µm or less, more preferably 25 µm or less, still more preferably 24.5 µm or less, and particularly preferably 24 µm or less.

The upper limit and the lower limit described above can be arbitrarily combined.

For example, the-volume average particle diameter of the talc is preferably 5.0 lam or greater and 25 µm or less, more preferably 5.5 µm or greater and 24.5 µm or less, and still more preferably 6.0 µm or greater and 24 µm or less.

In the present embodiment, the volume-average particle diameter of talc can be measured according to a laser diffraction method. The volume-average particle diameter thereof can be calculated in a state in which talc is dispersed in water under the following measurement conditions using a scattering particle size distribution measuring device "LA-950V2" (manufactured by HORIBA, Ltd.) as a measuring device.

[Measurement Conditions]

Refractive index of particles: 1.59-0.1i

Dispersion medium: water

Refractive index of dispersion medium: 1.33

In the present invention, the content of talc is preferably 5 parts by mass or greater, more preferably 10 parts by mass or greater, and particularly preferably 30 parts by mass or greater with respect to 100 parts by mass of the liquid crystal polyester resin (A). Further, the content thereof is preferably 100 parts by mass or less, more preferably 80 parts by mass or less, and particularly preferably 60 parts by mass or less with respect to 100 parts by mass of the liquid crystal polyester resin (A).

The upper limit and the lower limit described above can be arbitrarily combined.

For example, the content of the talc is preferably 5 parts by mass or greater and 100 parts by mass or less, more preferably 10 parts by mass or greater and 80 parts by mass or less, and still more preferably 30 parts by mass or greater and 60 parts by mass or less with respect to 100 parts by mass of the liquid crystal polyester resin (A).

Mica

Mica is a ground product of a silicate mineral containing aluminum, potassium, magnesium, sodium, iron, and the like. Further, mica is a mineral having a structure formed by interposing an octahedral structure formed of two or three metal oxides and hydroxides between four tetrahedral structures formed of three silicon (Si) atoms and one aluminum (Al) oxide atom.

Mica used in the present embodiment may be any of muscovite, phlogopite, fluorine phlogopite, tetrasilicon mica, and artificially produced synthetic mica. The mica may contain two or more kinds thereof.

It is preferable that the mica used in the present embodiment be formed of only muscovite.

Examples of a method for producing the mica include a water flow type jet grinding method, a wet grinding method, a dry ball mill grinding method, a pressured roller mill grinding method, an air flow type jet mill grinding method, and a dry grinding method using an impact grinder such as an atomizer From the viewpoint that the mica can be thinly and finely ground, it is preferable to use mica produced according to a wet grinding method.

In a case where a wet grinding method is performed, it is necessary to disperse the ground product in water. Further, to increase the dispersion efficiency of the ground product, polyaluminum chloride, aluminum sulfate, ferrous sulfate, ferric sulfate, copallas chloride, polyiron sulfate, polyferric chloride, an iron-silica inorganic polymer coagulant, a ferric chloride-silica inorganic polymer coagulant, or a coagulation sedimentation agent or a sedimentation assistant such as slaked lime $(Ca(OH)_2)$, caustic soda (NaOH), or soda ash $(Na_2CO_3)$ is typically added. However, these additives may cause decomposition of the liquid crystal polyester in some cases. Therefore, mica which does not use a coagulation sedimentation agent or a sedimentation assistant at the time of wet grinding is preferable as the mica used in the present invention.

In the present embodiment, the volume-average particle diameter of the mica is preferably 20 μm or greater, more preferably 21 μm or greater, and particularly preferably 22 μm or greater. Further, the volume-average particle diameter thereof is preferably 45 μm or less, more preferably 44 μm or less, and particularly preferably 43 μm or less.

The upper limit and the lower limit described above can be arbitrarily combined.

For example, the volume-average particle diameter of the mica is preferably 20 μm or greater and 45 μm or less, more preferably 21 μm or greater and 44 μm or less, and still more preferably 22 μm or greater and 43 μm or less.

In the present embodiment, the volume-average particle diameter of the mica can be measured according to a laser diffraction method. The volume-average particle diameter thereof can be calculated in a state in which mica is dispersed in water under the following measurement conditions using a scattering particle size distribution measuring device "LA-950V2" (manufactured by HORIBA, Ltd.) as a measuring device.

[Measurement Conditions]
Refractive index of particles: 1.57-0.1i
Dispersion medium: water
Refractive index of dispersion medium: 1.33

The mica with such a volume-average particle diameter has improved miscibility with the liquid crystal polyester and is capable of further improving the fluidity of the liquid crystal polyester resin composition of the present embodiment.

The content of the mica is preferably 5 parts by mass or greater, more preferably 10 parts by mass or greater, and still preferably 30 parts by mass or greater with respect to 100 parts by mass of the liquid crystal polyester resin (A).

Further, the content of the mica is preferably 100 parts by mass or less, more preferably 80 parts by mass or less, and particularly preferably 60 parts by mass or less with respect to 100 parts by mass of the liquid crystal polyester resin (A).

The upper limit and the lower limit described above can be arbitrarily combined.

For example, the content of the mica is preferably 5 parts by mass or greater and 100 parts by mass or less, more preferably 10 parts by mass or greater and 80 parts by mass or less, and still more preferably 30 parts by mass or greater and 60 parts by mass or less with respect to 100 parts by mass of the liquid crystal polyester resin (A).

Further, in the liquid crystal polyester resin composition in which the content of the mica in the liquid crystal polyester resin (A) is in the above-described range, the heat resistance of the molded product is improved and generation of blisters can be suppressed.

The liquid crystal polyester resin composition may contain one or more other components (additive components) in addition to the liquid crystal polyester resin (A) and the inorganic filler (B).

<<Additive Component>>

Examples of the additive component that can be contained in the liquid crystal polyester resin composition used in the present embodiment include resins other than the liquid crystal polyester resin (A) and additives known in the technical field.

Examples of the known additives in the technical field include higher fatty acid esters, release improvers such as metal soaps, colorants such as dyes or pigments, antioxidants, thermal stabilizers, ultraviolet absorbing agents, antistatic agents, surfactants, flame retardants, and plasticizers. Further, other examples thereof include additives having external lubricant effects such as higher fatty acids, higher fatty acid esters, higher fatty acid metal salts, and fluorocarbon-based surfactants. The kind and the amount of these additives are determined such that the excellent blister resistance of the liquid crystal polyester resin composition of the present invention is not extremely impaired.

The content of these additives is typically in a range of 0.01 to 5 parts by mass with respect to 100 parts by mass of the liquid crystal polyester resin (A).

Carbon Black

In the present embodiment, it is preferable to use carbon black as the colorant described as the additive component.

Examples of the carbon black used in the present embodiment include channel black type carbon black, furnace black type carbon black, lamp black type carbon black, thermal black type carbon black, ketjen black type carbon black, and naphthalene black type carbon black. Further, the liquid crystal polyester resin composition may contain two or more kinds thereof. Among these, furnace black type carbon black and lamp black type carbon black can be particularly preferably used, and commercially available carbon black for coloring can also be used as long as the carbon black has the above-described desired characteristics. The content of the carbon black is typically in a range of 0.1 to 2.5 parts by mass and more preferably in a range of 0.2 to 2.0 parts by mass with respect to 100 parts by mass of the liquid crystal polyester resin (A).

Release Agent

In the present embodiment, the moldability can be improved by further adding a release agent as the additive component. Examples of the release agent include tetrafluoroethylene, montanic acid and a salt thereof, an ester thereof, a half ester thereof, stearyl alcohol, stearamide, and polyethylene wax, and preferred examples thereof include tetrafluroethylene and a fatty acid ester of pentaerythritol. The content of the release agent is typically in a range of 0.1 to 1.0 parts by mass and more preferably in a range of 0.2 to 0.7 parts by mass with respect to 100 parts by mass of the liquid crystal polyester resin (A). In a case where the content of the release agent is in the above-described range, there is a tendency that mold contamination or blisters of the molded product are unlikely to be generated, and a releasing effect is obtained.

Resin that May be Contained in Addition to Liquid Crystal Polyester Resin (A)

Examples of the resins other than the liquid crystal polyester resin (A) include thermoplastic resins other than the liquid crystal polyester such as polypropylene, polyamide, polyester other than the liquid crystal polyester, polysulfone, polyether sulfone, polyphenylene sulfide, polyether ketone, polycarbonate, polyphenylene ether, and polyetherimide; and thermosetting resins such as a phenol resin, an epoxy resin, a polyimide resin, and a cyanate resin.

The content of the resin other than the liquid crystal polyester resin (A) is typically in a range of 0.1 to 20 parts by mass with respect to 100 parts by mass of the liquid crystal polyester resin (A).

The Present Invention Includes the Following Aspects.

<1> A pellet of a liquid crystal polyester resin composition, comprising: a liquid crystal polyester resin (A); and an inorganic filler (B), wherein the pellet has voids with a sphere equivalent diameter of 10 μm to 1000 μm, an abundance ratio of voids having a sphere equivalent diameter of less than 400 μm in a total amount of the voids is in a range of 40% to 90%, and an average number of the voids in one pellet having a length of 1 mm to 5 mm and a maximum diameter of 1 mm to 3 mm is in a range of 4 to 9.

<2> The pellet according to <1>, wherein the liquid crystal polyester resin composition comprises a liquid crystal polyester resin (A) and glass fiber and talc as an inorganic filler (B), the content of the liquid crystal polyester resin (A) is 55% by mass or greater and 65% by mass or less, preferably 60% by mass, with respect to the total mass of the pellets, the content of the glass fiber is 5% by mass or greater and 15% by mass or less, preferably 10% by mass, with respect to the total mass of the pellets, the content of the talc is 25% by mass or greater and 35% by mass or less, preferably 30% by mass, with respect to the total mass of the pellets, the pellet has voids with a sphere equivalent diameter of 10 μm to 1000 μm, an abundance ratio of voids having a sphere equivalent diameter of less than 400 μm in a total amount of the voids is in a range of 40% to 90%, preferably in a range of 70% to 90% and an average number of the voids in one pellet having a length of 1 mm to 5 mm and a maximum diameter of 1 mm to 3 mm is in a range of 4 to 9, preferably in a range of 7 to 9.

<3> The pellet according to <1> or <2>, wherein the length of the pellet is 1 mm to 5 mm, preferably 2 mm to 4 mm, and the maximum diameter of the pellet is 1 mm to 3 mm, preferably 2 mm to 3 mm.

<4> The pellet according to any one of <1> to <3>, wherein the length of the pellet is 2 mm to 4 mm, the maximum diameter of the pellet is 2 mm to 3 mm, and an average volume ratio of one void in one pellet is in a range of 0.040% to 0.12%, preferably 0.040% to 0.080%.

<5> The pellet according to any one of <1> to <4>, wherein the sphere equivalent diameter D10 is in a range of 150 μm to 240 μm, the sphere equivalent diameter D50 is in a range of 250 μm to 450 μm, and the sphere equivalent diameter D90 is in a range of 420 μm to 600 μm; preferably the sphere equivalent diameter D10 is in a range of 150 μm to 230 μm, the sphere equivalent diameter D50 is in a range of 250 μm to 400 μm, and the sphere equivalent diameter D90 is in a range of 420 μm to 550 μm.

<6> The pellet according to any one of <1> to <5>, wherein the liquid crystal polyester resin (A) comprises a repeating unit derived from 4-hydroxybenzoic acid, a repeating unit derived from terephthalic acid, a repeating unit derived from isophthalic acid, and a repeating unit derived from 4,4'-dihydroxybiphenyl, the number-average fiber length of the glass fibers is 60 μm or greater and 80 μm or less, preferably 70 μm, and the volume-average particle diameter of talc is 15 μm or greater and 30 μm or less, preferably 22 μm, <7> The pellet according to any one of <1> to <6>, wherein the flow start temperature of the liquid crystal polyester resin (A) is in a range of 280° C. to 350° C., preferably in a range of 290° C. to 330° C.

<Method for Producing Pellet of Liquid Crystal Polyester Resin Composition>

The method for producing the pellet of the liquid crystal polyester resin composition according to the present embodiment includes a step of melt-kneading the liquid crystal polyester resin (A) and the inorganic filler (B) using an extruder.

It is preferable that the pellet of the liquid crystal polyester resin composition be obtained by supplying the liquid crystal polyester resin (A), the inorganic filler (B), and other components used as necessary (hereinafter, these will be collectively referred to as raw material components in some cases) to an extruder, melt-kneading the components, and extruding the kneaded product.

That is, the method for producing the pellet of the liquid crystal polyester resin composition according to the present embodiment includes a step of melt-kneading the liquid crystal polyester resin (A) and the inorganic filler (B) using an extruder; and a step of molding the obtained kneaded material into the pellet.

An extruder which has a cylinder, one or more screws disposed in the cylinder and is provided with feed (supply) ports in two or more sites of the cylinder is preferable as the extruder, and an extruder which is provided with vent portions in one or more sites of the cylinder is more preferable as the extruder. Further, a cylinder provided with a main feed port, and a side feed port on a downstream side of the main feed port in an extrusion direction is preferable as the cylinder.

[Melt Kneading]

Figure 2:
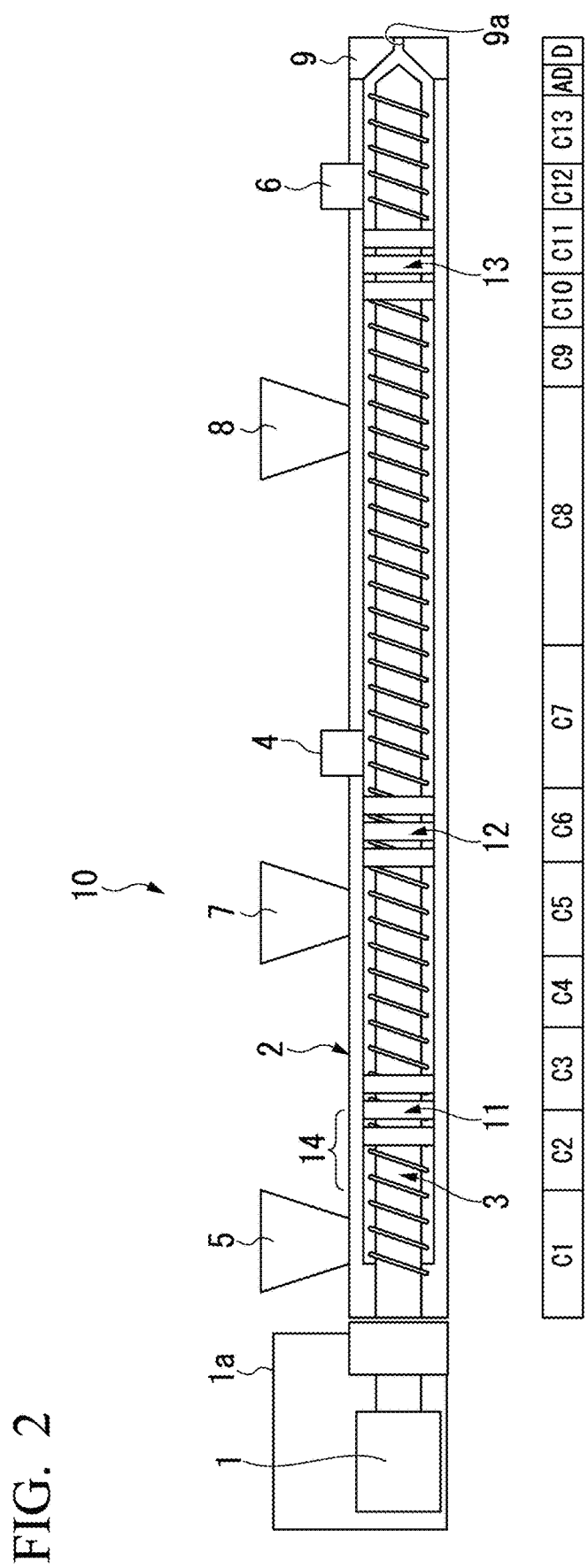
FIG. 2 is a schematic cross-sectional view illustrating an example of an extruder used in a method for producing a pellet of a liquid crystal polyester resin composition.

FIG. 2 is a schematic cross-sectional view illustrating an example of an extruder used in a melt-kneading step according to the present embodiment. Hereinafter, a case where the pellet of the liquid crystal polyester resin composition is produced using the extruder illustrated in FIG. 2 will be described.

According to the method for producing the pellet of the liquid crystal polyester resin composition of the present embodiment, the pellet of the liquid crystal polyester resin composition is produced by melt-kneading the liquid crystal polyester resin (A), the inorganic filler (B), and the raw material components using the extruder illustrated in FIG. 2.

An extruder 10 illustrated in FIG. 2 includes a motor 1 stored in a motor box 1a, a cylinder 2 provided adjacent to the motor box 1a, and a screw 3 inserted into the cylinder 2 and connected to the motor 1. The extruder 10 illustrated in FIG. 2 is a twin-screw extruder in which two screws 3 are inserted into a cylinder 2.

In FIG. 2, the cylinder 2 is provided with a main feed port 5 for supplying the liquid crystal polyester resin (A), the inorganic filler (B), and raw material components therein, a first side feed port 7 for supplying a part of the raw material components to the inside of the cylinder 2 as necessary on a downstream side of the main feed port 5 in the extrusion direction (rear side), a second side feed port 8 for supplying a part of the raw material components to the inside of the cylinder 2 as necessary, a first vent portion 4 and a second vent portion 6 for discharging volatile components (decomposed gas and the like) generated in the cylinder 2, and an ejection die 9 that molds the kneaded product obtained by being melt-kneaded. Further, the ejection die 9 includes a nozzle hole 9a.

By reducing the pressure in the vent portion of the cylinder 2, the inside of the cylinder 2 can be degassed under reduced pressure. Further, the vent portion may be used to simply release the decomposed gas in the cylinder 2 to the atmosphere.

In FIG. 2, degassing can be sufficiently performed by the first vent portion 4 and the second vent portion 6 for discharging volatile components (decomposed gas and the like) generated in the cylinder 2. The first vent portion 4 and the second vent portion 6 may be of an open vent type that is released to the atmosphere or a vacuum vent type that is connected to a water seal type pump, a rotary pump, an oil diffusion pump, a turbo pump, or the like to maintain the vacuum.

The opening length of the vent portion is preferably in a range of 0.5 to 5 times the diameter of the screw 3, and the opening width of the vent portion is preferably in a range of 0.3 to 1.5 times the diameter of the screw 3. In a case where the opening length and opening width of the vent portion are each in the above-described ranges, it is possible to prevent foreign matter from entering from the vent portion and to prevent the molten resin from being vent up (the molten resin rises above the vent portion) while the degassing effect is sufficiently ensured.

The main feed port 5, the first side feed port 7, and the second side feed port 8 include a hopper connected to the inside of the cylinder 2, and a supply device that supplies a constant mass or a constant volume of the raw material components. Examples of the supply system of the supply device include a belt type system, a screw type system, a vibration type system, and a table type system.

The screw 3 includes a transport unit for transporting the liquid crystal polyester resin composition.

Further, the screw 3 includes a first kneading unit 11 that performs plasticization and kneading of the liquid crystal polyester resin composition between the main feed port 5 and the first side feed port 7.

Further, the screw 3 includes a second kneading unit 12 that performs plasticization and kneading of the liquid crystal polyester resin composition between the first side feed port 7 and the first vent portion 4.

Further, the screw 3 includes a third kneading unit 13 that performs kneading of the liquid crystal polyester resin composition between the first vent portion 4 and the second vent portion 6.

Further, the screw 3 may further include a fourth kneading unit and a fifth kneading unit between the first vent portion 4 and the second vent portion 6. At this time, it is preferable to sufficiently control the temperature with respect to an increase in cylinder temperature due to shear heat generation.

In the present embodiment, the downstream side adjacent portion 14 adjacent to the downstream side of the main feed port 5, the first side feed port 7, and the second side feed port 8 each include a heater, and it is preferable that the heating temperature be controlled in each feed portion.

Specifically, it is preferable that the set temperature of the heater in the first side feed port 7 be set to be higher than the set temperature of the heater in the downstream side adjacent portion 14 by 50° C. to 100° C. Further, the set temperature of the heater in the first side feed port 7 is set to be higher than the set temperature of the heater in the downstream side adjacent portion 14 and is more preferably in a range of 50° C. to 90° C. and particularly preferably in a range of 60° C. to 80° C.

In a case where the inorganic filler (B) or the like at room temperature is supplied from the side feed port, the temperature of the molten resin tends to be lower than that of an upstream portion of the side feed port. It is considered that in a case where the temperature thereof is lowered, the melt viscosity of the resin is increased, and air is easily entrained. In the present embodiment, a decrease in the temperature of the cylinder accompanied by the supply of the inorganic filler (B) can be prevented by setting the set temperature of the side feed port to a specific temperature. In this manner, air entrainment is suppressed so that the sphere equivalent diameter of voids in the pellet, the abundance ratio of voids, and the number of voids can be controlled to be in the range of the present embodiment.

Further, it is preferable that the set temperature of the heater in the second side feed port 8 be set to be lower than the set temperature of the heater in the first side feed port 7 by 10° C. to 30° C. In this manner, the strand of the composition extruded from the nozzle hole 9a of the ejection die 9 is stabilized, and the workability during pellet processing is improved.

The screw 3 is formed by appropriately combining screw elements. Typically, the transport unit is formed by combining conventional flight (full flight) screw elements, and the kneading units 11, 12, and 13 are formed by combining screw elements such as a full flight, a reverse flight, a seal ring, a conventional kneading disk, a neutral kneading disk, and a reverse kneading disk.

The diameter of the screw 3 is preferably 60 mm or less and more preferably 58 mm or less. Further, the ratio (L/D) of the total length (L) to the entire width (D) of the cylinder 2 is preferably 50 or greater and more preferably 60 or greater. In a case where the diameter of the screw 3 is greater than or equal to the predetermined value and L/D is greater than or equal to the predetermined value, kneading can be sufficiently performed.

The diameter of the screw 3 is preferably 20 mm or greater, and more preferably 25 mm or greater. Further, the ratio (L/D) is preferably 100 or less, and more preferably 90 or less.

The upper limit and the lower limit described above can be arbitrarily combined.

For example, the diameter of the screw 3 is preferably 20 mm or greater and 60 mm or less, and more preferably 25 mm or greater and 58 mm or less. The ratio (L/D) is preferably 50 or greater and 100 or less, and more preferably 60 or greater and 90 or less.

The strand of the composition extruded from the nozzle hole 9a of the ejection die 9 is cut and processed into the pellet. For example, the strand may be solidified in advance by carrying out air cooling or water cooling at the time of cutting the strand. As a cutter used for cutting the strand, a cutter obtained by combining a rotary blade and a fixed blade is typically used.

The pellet of the liquid crystal polyester resin composition is suitable molding material for producing various molded products. As a method for molding the liquid crystal polyester resin composition, a melt molding method is preferable. Examples thereof include an injection molding method; an extrusion molding method such as a T-die method or an inflation method; a compression molding method; a blow molding method; a vacuum molding method; and a press molding method. Among these, the injection molding method is preferable.

Examples of products and components formed of the molded product of the pellet of the liquid crystal polyester resin composition include a bobbin such as an optical pickup bobbin or a transformer bobbin; a relay component such as a relay case, a relay base, a relay sprue, or a relay armature; a connector such as RIMM, DDR, a CPU socket, S/O, DIMM, a board to board connector, an FPC connector, or a card connector; a reflector such as a lamp reflector or an LED reflector; a holder such as a lamp holder or a heater holder; a diaphragm such as a speaker diaphragm; a separation claw such as a separation claw for a copying machine or a separation claw for a printer; a camera module component; a switch component; a motor component; a sensor component; a hard disk drive component; a dish such as ovenware; a vehicle component; an aircraft component; and a sealing member such as a sealing member for a semiconductor element or a sealing member for a coil.

EXAMPLES

Next, the present invention will be described in more detail with reference to examples.

<Production of Liquid Crystal Polyester Resin (A)>

Production Example 1 (Liquid Crystal Polyester Resin (A-1))

A reactor provided with a stirrer, a torque meter, a nitrogen gas introduction pipe, a thermometer, and a reflux condenser was charged with 994.5 g (7.2 mol) of 4-hydroxybenzoic acid, 446.9 g (2.4 mol) of 4,4'-dihydroxybiphenyl, 299.0 g (1.8 mol) of terephthalic acid, 99.7 g (0.6 mol) of isophthalic acid, and 1347.6 g (13.2 mol) of acetic anhydride, 0.2 g of 1-methyl imidazole was added thereto as a catalyst, and the inside of the reactor was sufficiently substituted with nitrogen gas.

Thereafter, the temperature of the mixture was increased from room temperature to 150° C. for 30 minutes while the mixture was stirred in a nitrogen gas flow, the same temperature was held, and the mixture was refluxed for 30 minutes.

Next, 2.4 g of 1-methyl imidazole was added thereto. Thereafter, the temperature of the mixture was increased from 150° C. to 320° C. for 2 hours and 50 minutes while by-product acetic acid and unreacted acetic anhydride were distilled off, and the temperature thereof was held to 320° C. for 30 minutes. After the temperature was held, the contents were taken out and cooled to room temperature.

Solid phase polymerization was performed by grinding the obtained solid material to have a particle diameter of 0.1 to 1 mm using a grinder, increasing the temperature from room temperature to 250° C. for 1 hour in a nitrogen atmosphere, further increasing the temperature from 250° C. to 296° C. for 5 hours, and holding the temperature at 296° C. for 3 hours. After the solid phase polymerization, the resultant was cooled, thereby obtaining a powdery liquid crystal polyester resin (A-1). The flow start temperature of the obtained liquid crystal polyester resin (A-1) was 328° C.

Production Example 2 (Liquid Crystal Polyester Resin (A-2))

A reactor provided with a stirrer, a torque meter, a nitrogen gas introduction pipe, a thermometer, and a reflux condenser was charged with 994.5 g (7.2 mol) of 4-hydroxybenzoic acid, 446.9 g (2.4 mol) of 4,4'-dihydroxybiphenyl, 239.2 g (1.44 mol) of terephthalic acid, 159.5 g (0.96 mol) of isophthalic acid, and 1347.6 g (13.2 mol) of acetic anhydride, 0.2 g of 1-methyl imidazole was added thereto as a catalyst, and the inside of the reactor was sufficiently substituted with nitrogen gas.

Thereafter, the temperature of the mixture was increased from room temperature to 150° C. for 30 minutes while the mixture was stirred in a nitrogen gas flow, the same temperature was held, and the mixture was refluxed for 1 hour.

Next, 0.9 g of 1-methyl imidazole was added thereto, the temperature of the mixture was increased from 150° C. to 320° C. for 2 hours and 50 minutes while by-product acetic acid and unreacted acetic anhydride were distilled off, and the temperature thereof was held at 320° C. for 30 minutes. After the temperature was held, the contents were taken out and cooled to room temperature.

Solid phase polymerization was performed by grinding the obtained solid material to have a particle diameter of 0.1 to 1 mm using a grinder, increasing the temperature from room temperature to 220° C. for 1 hour in a nitrogen atmosphere, further increasing the temperature from 220° C. to 241° C. for 0.5 hours, and holding the temperature at 241° C. for 10 hours. After the solid phase polymerization, the resultant was cooled, thereby obtaining a powdery liquid crystal polyester resin (A-2). The flow start temperature of the obtained liquid crystal polyester resin (A-2) was 292° C.

[Inorganic Filler (B)]

In the following examples, the following commercially available products were used as the inorganic fillers. Here, the number-average fiber length is the manufacturer's nominal value. In addition, the shapes of glass fibers described below are the shapes of the cross sections of the glass fibers in the radial direction.

Glass fiber (B-1): PF70E-001 (manufactured by Nitto Boseki Co., Ltd., approximately circular shape, diameter of 10 μm, number-average fiber length of 70 μm)

Glass fiber (B-2): EFH50-01S (manufactured by Central Glass Co., Ltd., approximately circular shape, diameter of 10 μm, number-average fiber length of 70 μm)

Talc (C-1): X-50 (manufactured by Nippon Talc, Co., Ltd., volume-average particle diameter of 22 μm, Ig. Loss of 5.0%)

Talc (C-2): GH50 (manufactured by Hayashi Kasei Co., Ltd., volume-average particle diameter of 22 μm, Ig. Loss of 5.5%)

[Other Components (D)]

Release agent (D-1): Roxyol VPG861 (manufactured by Emery Oleochemicals Japan Ltd., mixture of partial ester and full ester (tetrastearate) of pentaerythritol and stearic acid, 5% weight loss temperature of 310° C.)

Release agent (D-2): CEFRAL LUBE I (manufactured by Central Glass Co., Ltd., Low molecular weight tetrafluoroethylene resin)

Colorant (D-3): CB #960B (manufactured by Mitsubishi Chemical Corporation, carbon black)

In the following examples, the following device was used as a twin-screw extruder.

"TEM48SS" (manufactured by Toshiba Machine Co., Ltd.): screw diameter of 48 mm, 13 barrels (13 cylinder temperature control zones, 2 adapter and nozzle temperature control zones)

"MEGA58" (manufactured by Steer Japan Corporation): Screw diameter of 58 mm, 13 barrels (13 cylinder temperature control zones, 2 adapter and nozzle temperature control zones)

<Production of Pellet of Liquid Crystal Polyester Resin Composition>

Examples 1 to 4 and Comparative Examples 1 to 4

Using a twin-screw extruder ("TEM-48SS" manufactured by Toshiba Machine Co., Ltd. or "MEGA58" manufactured by Steer Japan Corporation), melt kneading was carried out under the conditions for distribution of raw material components and production listed in Tables 1 and 2, the obtained kneaded material was extruded and cut to obtain pellets of the liquid crystal polyester resin compositions.

Here, the cylinder temperature control zone, which is a section covering from the supply port that supplies the liquid crystal polyester resin to the twin-screw extruder to the outlet for melt extrusion, was divided into C1 to C13 zones as illustrated in FIG. 2.

The set temperature of the C1 zone was set to 80° C. and was constantly water-cooled. The set values of the cylinder temperatures from the C1 zone to the C13 zone are listed in Table 2.

AD and D in FIG. 2 and Table 2 each indicate a die adapter and a die and are set as the adapter and two nozzle temperature control zones, and each temperature listed in Table 2 was set as a set value.

The temperatures of respective zones are listed in Table 2.

A liquid crystal polyester resin (A-1 or A-2) and other components (D) were supplied from the main feed port 5 illustrated in FIG. 2, and talc (C-1 or C-2) was supplied from the first side feed port 7. The first vent portion 4 was at an open vent position, glass fibers (B-1 or B-2) were supplied from the second side feed port 8, and vacuum decompression was carried out from the second vent portion 6.

The set temperatures of the downstream side adjacent portion 14 adjacent to the downstream side of the main feed port 5 and the first side feed port 7 respectively correspond to the temperatures C2 and C5 in Table 2.

TABLE 1

|  | Unit | Example 1 | Example 2 | Example 3 | Example 4 | Comparative Example 1 | Comparative Example 2 | Comparative Example 3 | Comparative Example 4 |
|---|---|---|---|---|---|---|---|---|---|
| A-1 | Part by mass | 55 | 55 | 55 | 55 | 55 | 55 | 55 | 55 |
| A-2 | Part by mass | 45 | 45 | 45 | 45 | 45 | 45 | 45 | 45 |
| B-1 | Part by mass | 16.7 |  | 16.7 | 16.7 | 16.7 | 16.7 | 16.7 | 16.7 |
| B-2 | Part by mass |  | 16.7 |  |  |  |  |  |  |
| C-1 | Part by mass | 50 | 50 | 50 |  | 50 | 50 | 50 | 50 |
| C-2 | Part by mass |  |  |  | 50 |  |  |  |  |
| D-1 | Part by mass |  |  | 1 |  |  |  |  |  |
| D-2 | Part by mass | 0.5 | 0.5 |  | 0.5 | 0.5 | 0.5 | 0.5 | 0.5 |
| D-3 | Part by mass | 1.67 | 1.67 |  | 1.67 | 1.67 | 1.67 | 1.67 | 1.67 |
| Extruder |  | TEM48SS | MEGA58 | TEM48SS | TEM48SS | MEGA58 | MEGA58 | MEGA58 | MEGA58 |
| Screw diameter | mm | 48 | 58 | 48 | 48 | 58 | 58 | 58 | 58 |
| Screw rotation speed | rpm | 650 | 550 | 650 | 650 | 550 | 550 | 550 | 550 |
| Ejection amount | kg/hr | 500 | 550 | 500 | 500 | 550 | 550 | 550 | 550 |

TABLE 2

| | Set value of temperature in each temperature control zone (° C.) | | | | | | | | | | | | | | |
|---|---|---|---|---|---|---|---|---|---|---|---|---|---|---|---|
| | C1 | C2 | C3 | C4 | C5 | C6 | C7 | C8 | C9 | C10 | C11 | C12 | C13 | AD | D |
| Example 1 | 80 | 290 | 370 | 370 | 370 | 370 | 370 | 340 | 340 | 340 | 340 | 340 | 340 | 340 | 340 |
| Example 2 | 80 | 300 | 360 | 360 | 360 | 360 | 360 | 340 | 340 | 340 | 340 | 340 | 340 | 340 | 340 |
| Example 3 | 80 | 290 | 360 | 360 | 360 | 360 | 360 | 340 | 340 | 340 | 340 | 340 | 340 | 340 | 340 |
| Example 4 | 80 | 280 | 360 | 360 | 360 | 360 | 360 | 340 | 340 | 340 | 340 | 340 | 340 | 340 | 340 |
| Comparative Example 1 | 80 | 300 | 330 | 330 | 330 | 330 | 330 | 340 | 340 | 340 | 340 | 340 | 340 | 340 | 340 |
| Comparative Example 2 | 80 | 300 | 330 | 330 | 330 | 330 | 330 | 340 | 340 | 340 | 340 | 340 | 340 | 340 | 340 |
| Comparative Example 3 | 80 | 300 | 330 | 330 | 330 | 330 | 330 | 340 | 340 | 340 | 340 | 340 | 340 | 340 | 340 |
| Comparative Example 4 | 80 | 300 | 340 | 340 | 340 | 340 | 340 | 340 | 340 | 340 | 340 | 340 | 340 | 340 | 340 |

<Measurement of Length of Pellet and Maximum Diameter of Pellet>

100 pellets were arranged such that the cross section of each pellet was in a direction perpendicular to the flat plate. In a case where the shape of the cross section of each pellet was close to an ellipse, each pellet was fixed to double-sided tape such that the major axis of the cross section thereof was in a direction horizontal to the flat plate. Projected images (front projected images) of these arranged pellets were captured using a VR-3200 one-shot 3D shape measuring device (manufactured by Keyence Corporation) in a direction perpendicular to the flat plate on which the pellets were allowed to stand and from the above of the standing pellets.

Using the front projected images of the captured pellets, the vertical Feret diameter and the horizontal Feret diameter of each pellet were measured using bundled analysis software. The average value of the horizontal Feret diameters of each pellet was calculated and defined as the length (mm) of the pellet. In addition, the average value of the vertical Feret diameters was calculated and defined as the maximum diameter (mm) of the pellet. These results are listed in Table 3.

<Method for Measuring Voids in Pellet>

A polypropylene container (a cylindrical polypropylene container with a height of 20 mm, a diameter of 24 mm, and a thickness of 1 mm) was filled with approximately 200 to 750 obtained pellets, and images obtained using an X-ray CT scanner were analyzed through 3D image analysis. In this manner, the total volume ($\mu m^3$) of all pellets (with respect to the total number of the measured pellets) used for the measurement, the number of voids (pieces), and the volume ($\mu m^3$) of the voids were each measured. These measurement results and the total number of pellets used for the measurement (total number of measured pellets/pieces) are listed in Table 3.

Based on these measurement results, the ratio (%) of the volume of voids to the volume of pellets, the average number of voids (pieces/one pellet), the average volume ratio (%) of one void in one pellet, and the average volume ($\mu m^3$/one void) of one void were each calculated as follows, and the results are listed in Table 3.

Ratio of volume of voids to volume of pellets (%)=
(volume of voids in total number of measured pellets)/(volume of pellets in total number of measured pellets)×100

Average number of voids (pieces/one pellet)=number of voids in total number of measured pellets/total number of measured pellets Average volume ratio of one void in one pellet (%)=
[(volume of voids in total number of measured pellets)/(volume of pellets in total number of measured pellets)]/[(number of voids in total number of measured pellets)/(total number of measured pellets)]×100

Average volume per void ($\mu m^3$/one void)=(volume of voids in total number of measured pellets)/(number of voids in total number of measured pellets)

Hereinafter, the 3D image analysis conditions and the procedures are described.

Measuring device: Skyscan 1272 manufactured by Bruker
Number of pixels: 1344×896
Measurement conditions: 20 $\mu m$/pixel
Filter: Aluminum filter (filter diameter of 0.5 mm), Copper filter (filter diameter of 0.03 mm)
Acceleration voltage: 90 kV
Current value: 111 $\mu A$
Number of times of integration: 2
Rotation: half scan
Measurement time: approximately 60 minutes
Image analysis: software attached to Skyscan 1272

In this operation, first, spatial correction (20 $\mu m$/pixel) is performed, then noise is removed using a median filter, and finally, the pellet resin portion and the void portion are identified. Further, the images are binarized by Auto-LW. At this time, the space between adjacent pellets and the voids contained in one pellet are identified using the image calculation function, and the voids in one pellet are extracted.

An example of the actual procedures is as follows.

First, the obtained three-dimensional observation image was read by analysis software (software attached to Skyscan 1272), spatial correction (20 $\mu m$/pixel) was performed, noise was removed by a median filter, and finally the pellet resin portion and the void portion were identified. Further, the images are binarized by Auto-LW. At this time, the space between adjacent pellets and the voids contained in one pellet are identified using the image calculation function, and the voids in one pellet are extracted.

Further, the sphere equivalent diameter D50 of voids was calculated from the volume-based cumulative particle size distribution curve obtained using the 3D image analysis described above. The sphere equivalent diameters D10 and D90 of voids were also calculated in the same manner as that for the sphere equivalent diameter D50 of voids. These results are listed in Table 3.

The abundance ratio of voids with a sphere equivalent diameter of less than 400 $\mu m$ was acquired as the cumulative volume (%) of voids with a sphere equivalent diameter of 400 $\mu m$ in the volume-based cumulative particle size distribution curve. The results are listed in Table 3.

TABLE 3

| Analysis item | | Unit | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| Length of pellet | | mm | 3.2 | 3.1 | 3.5 | 3.4 | 3.3 | 3.5 | 3.1 | 3.3 |
| Maximum diameter of pellet | | mm | 2.8 | 2.7 | 3.0 | 3.0 | 3.0 | 2.9 | 2.5 | 2.9 |
| Total number of measured pellets | | Piece | 240 | 243 | 354 | 362 | 300 | 745 | 350 | 236 |
| With respect to total number of measured pellets | Volume of pellet | $\mu m^3$ | $2.1 \times 10^{12}$ | $2.1 \times 10^{12}$ | $3.4 \times 10^{12}$ | $3.4 \times 10^{12}$ | $3.3 \times 10^{12}$ | $3.4 \times 10^{12}$ | $3.4 \times 10^{12}$ | $2.1 \times 10^{12}$ |
| | Number of voids | Piece | 1739 | 1806 | 2927 | 1482 | 1104 | 858 | 984 | 718 |
| | Volume of voids | $\mu m^3$ | $7.4 \times 10^{9}$ | $9.6 \times 10^{9}$ | $1.6 \times 10^{10}$ | $1.4 \times 10^{9}$ | $2.1 \times 10^{10}$ | $5.5 \times 10^{9}$ | $1.3 \times 10^{10}$ | $8.6 \times 10^{9}$ |
| Ratio of volume of voids to volume of pellet | | % | 0.35 | 0.45 | 0.46 | 0.42 | 0.65 | 0.16 | 0.39 | 0.40 |

TABLE 3-continued

| Analysis item | Unit | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Average number of voids | piece/one pellet | 7.2 | 7.4 | 8.3 | 4.1 | 3.7 | 1.2 | 2.8 | 3.0 |
| Average volume ratio of one void in one pellet | % | 0.048 | 0.061 | 0.056 | 0.103 | 0.177 | 0.139 | 0.139 | 0.131 |
| Average volume per void | $\mu m^3$/one void | $4.2 \times 10^6$ | $5.3 \times 10^6$ | $5.3 \times 10^6$ | $9.6 \times 10^6$ | $1.9 \times 10^7$ | $6.4 \times 10^6$ | $1.4 \times 10^7$ | $1.2 \times 10^7$ |
| Sphere equivalent diameter D10 | $\mu m$ | 167 | 178 | 179 | 235 | 298 | 241 | 292 | 292 |
| Sphere equivalent diameter D50 | $\mu m$ | 279 | 314 | 330 | 429 | 523 | 519 | 513 | 518 |
| Sphere equivalent diameter D90 | $\mu m$ | 439 | 453 | 516 | 579 | 695 | 669 | 751 | 751 |
| Abundance ratio of voids with sphere equivalent diameter of less than 400 $\mu m$ | % | 85 | 78 | 71 | 42 | 22 | 27 | 26 | 24 |

[Solder Resistance Test]

Using an injection molding machine ("PNX40-5A" manufactured by Nissei Plastic Industry Co., Ltd.), JIS K 7161 (1/2) dumbbell test pieces with a thickness of 1.2 mm were injection-molded under molding conditions of a molding temperature of 350° C., a mold temperature of 130° C., and an injection speed of 90 mm/sec.

The obtained test pieces were placed in a heat circulation oven ("DN63H" manufactured by Yamato Scientific Co., Ltd.) for 3 minutes, and the temperature at which blisters were not generated on the test pieces was measured. Specifically, ten test pieces were placed in an oven at a constant temperature, held for 3 minutes, and taken out, and the resulting test pieces were observed with a microscope ("VHX-1000" manufactured by Keyence Corporation). The maximum temperature at which there was no blister with a size of 0.1 mm$^2$ or greater in the test pieces was set as the solder-resistant temperature (° C.). The results are listed in Table 4. It was determined that the blister resistance of the molded product increases as the solder-resistant temperature increases.

[Deflection Temperature Under Load]

Using an injection molding machine ("PNX40-5A" manufactured by Nissei Plastic Industry Co., Ltd.), the deflection temperature under load (° C.) of a test piece as a molded product was measured at a temperature increase rate of 2° C./min under a load of 1.82 MPa according to a method in conformity with ASTM D648 using a test piece with length of 127 mm, a width of 12.7 mm, a thickness of 6.4 mm which was prepared under molding conditions of a molding temperature 350° C., a mold temperature of 130° C., an injection speed 75 mm/sec. The measurement results are listed in Table 4.

[Tensile Strength]

Using an ASTM No. 4 test piece prepared using an injection molding machine ("PNX40-5A" manufactured by Nissei Plastics Industries, Ltd.) under molding conditions of a molding temperature of 350° C., a mold temperature of 130° C., and an injection speed of 75 mm/sec. The tensile strength (MPa) of a test piece as a molded product was measured by a method based on ASTM D638. The results are listed in Table 4.

TABLE 4

| | Unit | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Solder-resistant temperature | ° C. | 290 | 290 | 290 | 280 | 250 | 260 | 260 | 260 |
| Deflection temperature under load | ° C. | 245 | 240 | 245 | 245 | 238 | 237 | 236 | 237 |
| Tensile strength | MPa | 96 | 96 | 97 | 95 | 91 | 93 | 91 | 92 |

As shown in the results listed in Table 4, in Examples 1 to 4 to which the present invention was applied, the solder-resistant temperature was higher than that of each comparative example, and the generation of blisters was suppressed.

In addition, in Examples 1 to 4 to which the present invention was applied, the deflection temperature under load and the tensile strength were higher than those of each comparative example, and the mechanical strength of the molded product was also satisfactory.

EXPLANATION OF REFERENCES

1: motor
1a: motor box
2: cylinder
3: screw
4: first vent portion
5: main feed port
6: second vent portion
7: first side feed port
8: second side feed port
9: ejection die
9a: nozzle hole
10: extruder
11: first kneading unit 12: second kneading unit
13: third kneading unit
14: downstream side adjacent portion
20: pellet

What is claimed is:

1. A pellet of a liquid crystal polyester resin composition, comprising:
   a liquid crystal polyester resin (A); and
   an inorganic filler (B),
   wherein the pellet has voids with a sphere equivalent diameter of 10 μm to 1000 μm,
   an abundance ratio of voids having a sphere equivalent diameter of less than 400 μm in a total amount of the voids is in a range of 40% to 90%, and
   an average number of the voids in one pellet having a length of 1 mm to 5 mm and a maximum diameter of 1 mm to 3 mm is in a range of 4 to 9.

2. The pellet according to claim 1,
   wherein D50 of a sphere equivalent diameter of the voids in the pellet is in a range of 200 μm to 500 μm.

3. The pellet according to claim 1,
   wherein an average volume ratio of one void in one pellet is in a range of 0.040% to 0.12%.

4. The pellet according to claim 1,
   wherein the abundance ratio of voids having a sphere equivalent diameter of less than 400 μm in the total amount of the voids is in a range of 70% to 90%.

5. The pellet according to claim 1,
   wherein the inorganic filler (B) is at least one inorganic filler selected from the group consisting of chopped glass fibers, milled glass fibers, talc, and mica.

6. The pellet according to claim 1,
   wherein the liquid crystal polyester resin (A) has a repeating unit represented by Formula (1) shown below:

—O—Ar¹—CO— (1)

in which Ar¹ represents a phenylene group, a naphthylene group, or a biphenylylene group, the hydrogen atoms in the group represented by Ar¹ may each independently be substituted with a halogen atom, an alkyl group, or an aryl group.

7. The pellet according to claim 6,
   wherein the liquid crystal polyester resin (A) further has a repeating unit represented by Formula (2) shown below, and a repeating unit represented by Formula (3) shown below:

—CO—Ar²—CO— (2)

—X—Ar³—Y— (3)

in which Ar² and Ar³ each independently represents a phenylene group, a naphthylene group, a biphenylylene group, or a group represented by Formula (4) shown below, X and Y each independently represents an oxygen atom or an imino group, the hydrogen atoms in the group represented by Ar², or Ar³ may each independently be substituted with a halogen atom, an alkyl group, or an aryl group:

—Ar⁴—Z—Ar⁵— (4)

in which Ar⁴ and Ar⁵ each independently represents a phenylene group or a naphthylene group, Z represents an oxygen atom, a sulfur atom, a carbonyl group, a sulfonyl group, or an alkylidene group, the hydrogen atoms in the group represented by Ar⁴ or Ar⁵ may each independently be substituted with a halogen atom, an alkyl group having 1 to 10 carbon atoms, or an aryl group having 6 to 20 carbon atoms.

8. The pellet according to claim 6,
   wherein a content of the liquid crystal polyester resin (A) is 50% by mass or greater and 70% by mass or less, and a content of the inorganic filler (B) is 30% by mass or greater and 50% by mass or less, with respect to the total mass of the pellets.

9. The pellet according to claim 7,
   wherein a content of the liquid crystal polyester resin (A) is 50% by mass or greater and 70% by mass or less, and a content of the inorganic filler (B) is 30% by mass or greater and 50% by mass or less, with respect to the total mass of the pellets.

10. The pellet according to claim 7,
    wherein D50 of a sphere equivalent diameter of the voids in the pellet is in a range of 200 μm to 500 μm.

11. The pellet according to claim 7,
    wherein an average volume ratio of one void in one pellet is in a range of 0.040% to 0.12%.

12. The pellet according to claim 7,
    wherein the abundance ratio of voids having a sphere equivalent diameter of less than 400 μm in the total amount of the voids is in a range of 70% to 90%.

13. The pellet according to claim 7,
    wherein the inorganic filler (B) is at least one inorganic filler selected from the group consisting of chopped glass fibers, milled glass fibers, talc, and mica.

14. A method for producing the pellet according to claim 1, the method comprising:
    a step of melt-kneading the liquid crystal polyester resin (A) and the inorganic filler (B) using an extruder,
    wherein the extruder includes a main feed port, a downstream side adjacent portion, and a first side feed port in this order toward a downstream in an extrusion direction,
    the extruder supplies the liquid crystal polyester resin (A) from the main feed port and supplies the inorganic filler (B) from the first side feed port,
    the downstream side adjacent portion and the first side feed port each include a heater, and
    a set temperature of the heater included in the first side feed port is set to be higher than a set temperature of the heater included in the downstream side adjacent portion by 50° C. to 100° C.

15. The method according to claim 14,
    wherein the extruder further comprises a second side feed port on the downstream side of the first side feed port in the extrusion direction,
    the extruder supplies the inorganic filler (B) from the second side feed port,
    the second side feed port includes a heater, and
    a set temperature of the heater included in the second side feed port is set to be lower than the set temperature of the heater included in the first side feed port by 10° C. to 30° C.

* * * * *